US012644206B2

(12) United States Patent
Schiros et al.

(10) Patent No.: US 12,644,206 B2
(45) Date of Patent: Jun. 2, 2026

(54) ALGINATE-BASED FIBERS AND USES THEREOF

(71) Applicants: THE TRUSTEES OF COLUMBIA UNIVERSITY IN THE CITY OF NEW YORK, New York, NY (US); FASHION INSTITUTE OF TECHNOLOGY, New York, NY (US)

(72) Inventors: Theanna Schiros, New York, NY (US); Asta Skocir, New York, NY (US); Aaron Nesser, New York, NY (US); Tessa Callaghan, New York, NY (US); Aleksandra Gosiewski, New York, NY (US); Sebastian Thomas Russell, New York, NY (US); Dong An, New York, NY (US); Romare Antrobus, New York, NY (US); Chris Mosher, New York, NY (US); Helen Lu, New York, NY (US)

(73) Assignees: The Trustees of Columbia University in the City of New York, New York, NY (US); Fashion Institute of Technology, New York, NY (US)

( * ) Notice: Subject to any disclaimer, the term of this patent is extended or adjusted under 35 U.S.C. 154(b) by 580 days.

(21) Appl. No.: 17/299,563

(22) PCT Filed: Dec. 5, 2019

(86) PCT No.: PCT/US2019/064731
§ 371 (c)(1),
(2) Date: Jun. 3, 2021

(87) PCT Pub. No.: WO2020/118080
PCT Pub. Date: Jun. 11, 2020

(65) Prior Publication Data
US 2022/0033995 A1 Feb. 3, 2022

Related U.S. Application Data

(60) Provisional application No. 62/776,850, filed on Dec. 7, 2018.

(51) Int. Cl.
*D01F 2/28* (2006.01)
*C08L 1/28* (2006.01)
*D01F 1/10* (2006.01)

(52) U.S. Cl.
CPC ................. *D01F 2/28* (2013.01); *C08L 1/28* (2013.01); *D01F 1/10* (2013.01); *D10B 2401/063* (2013.01)

(58) Field of Classification Search
None
See application file for complete search history.

(56) References Cited

U.S. PATENT DOCUMENTS 2,317,492 A * 4/1943 Speakman ................ D01F 9/04
8/115.64
2,423,075 A 6/1947 Hall
(Continued)

FOREIGN PATENT DOCUMENTS

CN 105734719 * 7/2006
CN 1995512 A 7/2007
(Continued)

OTHER PUBLICATIONS

Machine Translation of CN105734719 (Year: 2016).*
(Continued)

*Primary Examiner* — Shawn Mckinnon
(74) *Attorney, Agent, or Firm* — BakerHostetler

(57) ABSTRACT

An alginate-based fiber is made of a composition comprising an alginate, a cellulose and a polyol plasticizer, such as glycerol. The fiber is produced through extrusion in a curing bath containing calcium. The fiber provides excellent (Continued)

strength and flexibility in its unhydrated state for textile applications. The fiber can be used to produce textiles as compostable alternatives to petrochemical based polymers.

12 Claims, 24 Drawing Sheets

(56) References Cited

U.S. PATENT DOCUMENTS

| | | | |
|---|---|---|---|
| 2,852,834 | A | 9/1958 | Engelhard |
| 6,080,420 | A | 6/2000 | Qin et al. |
| 7,057,023 | B2 | 6/2006 | Islam et al. |
| 8,722,749 | B2 * | 5/2014 | Durance ................... F26B 5/06 |
| | | | 521/64 |
| 9,562,305 | B2 | 2/2017 | Bonnefin et al. |
| 2005/0101900 | A1 * | 5/2005 | Qin ......................... A61L 15/18 |
| | | | 602/49 |
| 2018/0015197 | A1 | 1/2018 | Cotton |

FOREIGN PATENT DOCUMENTS

| | | | |
|---|---|---|---|
| CN | 1332081 | C | 8/2007 |
| CN | 101033564 | A | 9/2007 |
| CN | 101381907 | A | 3/2009 |
| CN | 101433443 | A | 5/2009 |
| CN | 101168869 | B | 9/2010 |
| CN | 101967698 | A | 2/2011 |
| CN | 201986921 | U | 9/2011 |
| CN | 102370254 | A | 3/2012 |
| CN | 103060946 | * | 4/2013 |
| CN | 103357062 | * | 10/2013 |
| CN | 105237812 | * | 1/2016 |
| CN | 107043977 | A | 8/2017 |
| GB | 2496310 | A | 5/2013 |
| JP | 09-195181 | A | 7/1997 |
| KR | 10-1125253 | B1 | 3/2012 |
| WO | 99/64080 | A1 | 12/1999 |
| WO | 03/03850 | A1 | 1/2003 |

OTHER PUBLICATIONS

Machine Translation of CN103060946 (Year: 2013).*
Machine Translation of CN105237812 (Year: 2016).*
Machine Translation of CN103357062 (Year: 2013).*

* cited by examiner

Figure 4. Stress-strain curves of 4 ply low viscosity alginate:methyl cellulose extruded fibers.

ALGINATE-BASED FIBERS AND USES THEREOF

PRIORITY AND CROSS REFERENCE TO RELATED APPLICATIONS

This application is the U.S. National Stage Application under 35 U.S.C. § 371 of International Application No. PCT/US2019/064731, filed Dec. 5, 2019, designating the U.S. and published in English as WO 2020/118080 A1 on Jun. 11, 2020, which claims the benefit of U.S. Provisional Application No. 62/776,850 filed on Dec. 7, 2018, which is hereby incorporated by reference in its entirety.

STATEMENT REGARDING FEDERALLY SPONSORED R&D

This invention was made with government support under Grant No. 1420634 awarded by the National Science Foundation. The government has certain rights in the invention.

BACKGROUND

Field

The present application provides an alginate-based fiber made of a composition comprising an alginate, a cellulose and a polyol plasticizer. The alginate-based fiber can be used to produce textiles as compostable alternatives to petrochemical based polymers in a range of applications, such as footwear, apparel, accessories, packaging, and furniture industries.

Description of the Related Art

Alginate, i.e. alginic acid, is a polymer which can be found in a wide range of species of algae, such as in ascophyllum, durvillaea, ecklonia, *laminaria*, lessonia, macrocystis, sargassum, and turbinaria. Alginates are natural polysaccharides consisting of linear copolymers of β-(1-4) linked d-mannuronic acid and β-(1-4)-linked 1-guluronic acid units. Alginate fibers can be prepared by extrusion, such as by extruding solutions of sodium alginate into a bath of calcium ions, which can be produced in various forms such as calcium alginate, calcium/sodium alginate, sodium alginate, zinc alginate, and silver alginate fibers.

SUMMARY

In some embodiments, an alginate composition comprises sodium alginate, methyl cellulose, and a polyol plasticizer, the polyol plasticizer being glycerol, an amount of methyl cellulose is about 50 wt % to about 90 wt % of sodium alginate, an amount of sodium alginate ranges from about 3.75 wt % to about 7.85 wt % of the total mass, and an amount of glycerol ranges from about 25 wt % to about 250 wt % of a total amount of sodium alginate and methyl cellulose. In some embodiments, the amount of sodium alginate is about 5.75 wt %. In some embodiments, the alginate has a purity of 80% or more.

In some embodiments, a fiber is produced from any of the embodiments of an alginate composition herein. In some embodiments, the fiber is produced by curing the alginate composition of claim 1 in a curing bath, is produced through extrusion, and has a tensile strength of about 0.1 grams/denier to about 0.8 grams/denier. In some embodiments, the curing bath comprises water and calcium chloride. In some embodiments, water is deionized or distilled. In some embodiments, an amount of calcium chloride ranges from about 0.08 M to about 0.15 M. In some embodiments, the amount of calcium chloride is about 0.12 M. In some embodiments, a calcium content in the fiber ranges from about 2.5 wt % to about 5.25 wt %.

In some embodiments, a fabric containing any of the embodiments of a fiber herein. In some embodiments, the fiber is contained within a yarn, a knit, or a woven textile. In some embodiments, a the yarn is contained within an apparel, a garment, or a piece of clothing. In some embodiments, a the fiber is combined with a natural or non-alginate-based synthetic fiber. In some embodiments, a the fiber comprises a dye using a dip-dying or dope-dying process.

In some embodiments, a film is produced from any of the embodiments of alginate composition provided herein.

BRIEF DESCRIPTION OF THE DRAWINGS

Further features of the inventive concept, its nature and various advantages will be more apparent from the following detailed description, taken in conjunction with the accompanying figures.

DETAILED DESCRIPTION

Figure 1:
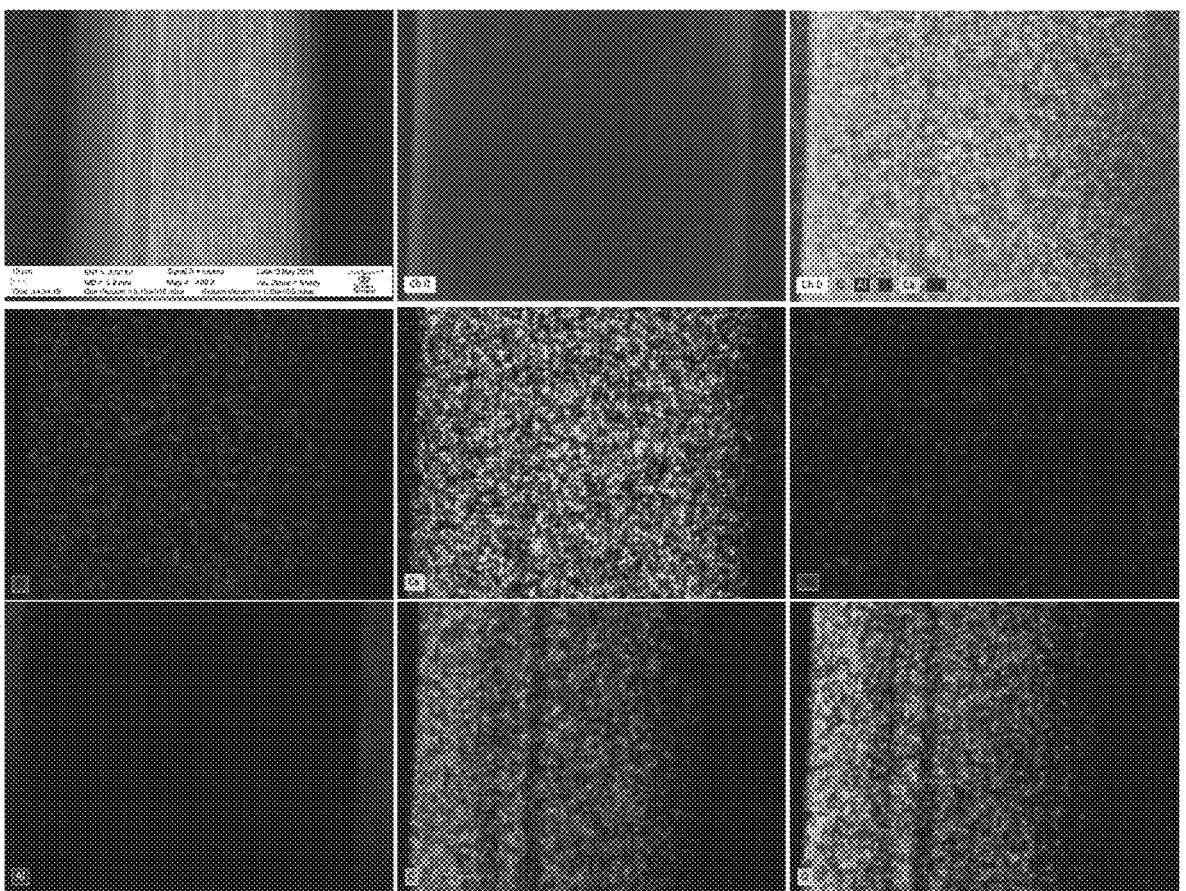
FIG. 1 shows SEM (top left), EDX image (top middle), and elemental composition (remaining) of low viscosity alginate microfibers.

The present application provides alginate-based fibers. In some embodiments, they utilize biomaterials with a significantly lower environmental footprint than conventional textiles, which can be used as sustainable bio-based textile alternatives for the applications in footwear, apparel, accessories, packaging, and furniture industries.

Some of the present embodiments provide for the utilization of alginate and other polysaccharides to produce biomaterials in various flexible forms, such as knit, woven, cast films or 3-D printed materials, to produce sustainable textiles and fibers. Alginate-based fibers with unexpected excellent mechanical strength and flexibility have been developed through synergistic iterations of chemical modification with various mechanical testing, which can be used as a textile or compostable alternative to petrochemical based polymers in a range of applications.

Some embodiments of the alginate-based fiber provide adequate strength and flexibility in its unhydrated state for textile applications, which can be superior in comparison to the conventional alginate fiber. The conventional alginate fibers in general become too brittle in their dehydrated states to maintain sufficient flexibility and tenacity for use in garments.

Throughout this description, the embodiments and examples provided herein should be considered as exemplar, rather than as limitations of the present application.

The present invention is related to alginate compositions comprising sodium alginate, methyl cellulose, and a polyol plasticizer, the polyol plasticizer being glycerol. The compositions comprise a defined amount of sodium alginate with respect to methyl cellulose, a defined amount of sodium alginate, and a defined amount of glycerol with respect to a total amount of sodium alginate and methyl cellulose. The present invention is also related to fibers and films produced from the alginate compositions disclosed herein. The present invention is also related to fabrics containing the fibers disclosed herein.

Alginates have been used in manufacturing wound dressing due to their excellent gel-forming characteristics and absorbent properties. Kaltostat is an example of a commercial alginate wound dressing which is consisting of a mixture of calcium and sodium alginate. Alginates have a variety of applications, such as in textile, food, drink, cosmetics, papermaking, pharmaceutical, biomedical and chemical industries as a thickener, gelling agent, absorbent, drug dispersal, and cell encapsulation. Various applications been developed to use sodium alginate processed to calcium alginate as a fiber, via electrospinning with propylene glycol for cellular culture matrices and via wet spinning for textiles to treat and protect wounds. Pure calcium alginate yarns and hybrid yarns of multiple fibers may be spun into yarns. Alginates can be combined with calcium chloride or other source of free calcium ions to convert sodium alginate into calcium alginate which is non-water soluble.

In some embodiments, alginates can be combined with cellulose, pectin, chitin or other compounds to form alginate-based fibers, filaments, textiles, non-woven fabrics, wound dressing, or films through various processes, such as coagulation bath, wet spinning, viscose spinning, as disclosed in U.S. Pat. No. 2,423,075, CN101967698B, U.S. Pat. No. 5,096,754A, PCT/US2002/020542, CN103060946B, KR101125253B1, U.S. Pat. No. 7,057, 023B2, CN101168869B, GB2496310B, PCT/GB199/ 001796, CN 201710219227, U.S. Pat. No. 9,562,305B2, CN101433443A, CN101033564A, CN1986921A, CN1023701254A, CN1332081C, CN101381907B, and U.S. Pat. No. 6,080,420A.

In general, traditional alginate yarns fail to meet the elasticity, resilience and tenacity requirements of yarn for industrial textile applications. Pure alginate fibers experience a decrease in tensile strength when hydrated, and a decrease in flexibility when dehydrated, which become brittle plastics. Various attempts have been made to combine alginate into biopolymer composites as well as with other fibers in hybrid yarns with improved mechanical properties. For example, U.S. Pat. No. 2,852,834 outlines a method of wrapping elastic fiber with alginate fibers to produce an elastic-core fiber with alginate wrap to combine the mechanical properties of elastic with the hygroscopic properties of sodium alginate. Other strategies for combining the properties of alginate with other existing fibers have been devised, including spinning together staple fibers of pure alginate with other natural and synthetic fibers such as copper, carboxymethyl cellulose, sodium carboxymethyl cellulose, viscose, soybean protein, pectin, cellulose compounds, chitin, wool, and tencel (GB2496310B, CN 201710219227, CN103060946B, CN1995512A).

In some embodiments provided herein, the compositions for producing an alginate-based fiber for textile application comprises alginate and methylcellulose. In some embodiments, the composition comprises alginate, methylcellulose and a polyol plasticizer. The alginate-based fiber of the present application provides strength, elasticity and flexibility, with a tensile strength of up to 0.8 grams/denier. When the alginate-based fiber of the present application is wet-spun into a filament or other materials, this filament or material has minimized water absorption and maximized wicking ability. This filament can be spun finely and made into yarn, knit or woven textiles which can be used to produce textile objects, such as apparel, garment, or clothing which can be wore comfortably against the skin. The alginate-based yarn of the present application provides the unique advantages of having the tensile strength of an elastic plastic and the absorbency of the conventional alginate yarn.

The present application also provides a method to combine the alginate-based fiber of the present application with other existing fibers, including spinning together staple fibers of alginate with other natural and synthetic fibers, and coating existing yarns with alginate hydrogels or filaments.

The present application also provides methods to color the alginate-based yarn of the present application including a traditional dip-dying or dope-dyeing process, wherein a colorant is added into the hydrogel mixture or dope. Various ranges of dyes can be used to color the alginate-based yarn of the present application without affecting the inherent chemistry or mechanical properties of the alginate-based yarn, including natural, non-toxic, or biosynthetic dyes which are produced by a genetically modified organism.

The present application also provides post-production processes to increase the tensile strength and water resistance of the alginate-based fiber or yarn of the present application including controlled re-wetting and drying. For example, a combination of distilled or deionized water and lecithin can be applied in a post-production process for alginate-based fiber or yarn. The post-production process includes immersing the alginate-based yarn in a composition comprising deionized water and phospholipids for an interval of time, before being washed in deionized water and then dried. Swell tests are used to measure the water absorption of the alginate-based yarn after performing a post-production process, such as a surface treatment. The alginate-based fiber which were treated with a surface treatment showed a 34% reduction in water absorption. Physical and chemical modifications are performed to increase the strength and water resistance of the alginate-based fiber or yarn in the post-production process.

In some embodiments, the compositions of the present application for producing an alginate-based fiber for textile application comprise an alginate and a polysaccharide. In some embodiments, the composition comprises an alginate, a polysaccharide and a polyol plasticizer. In some embodiments, the polysaccharide is a cellulose or a cellulose derivative.

Non-limiting examples of polysaccharide include the group carageenan, agar, gellan, agarose, alginic acid, ammonium alginate, annacardium *occidentale* gum, calcium alginate, carboxyl methyl-cellulose (CMC), carubin, chitosan acetate, chitosan lactate, E407a processed eucheuma seaweed, gelrite, guar gum, guaran, hydroxypropyl methylcellulose (HPMC), isabgol, locust bean gum, pectin, pluronic polyol F127, polyoses, potassium alginate, pullulan, sodium alginate, sodium carmellose, tragacanth, xanthan gum, galactans, agaropectin and mixtures thereof. In some embodiments, the polysaccharide may be extracted from seaweed and other aquatic plants. In some embodiments, the polysaccharide is agar.

In some embodiments, the compositions for producing an alginate-based fiber for textile application comprises an alginate and a cellulose. In some embodiments, the composition comprises an alginate, a cellulose and a polyol plasticizer; wherein the alginate is a low molecular weight alginate or a high molecular weight alginate; wherein the cellulose is a methylcellulose, ethylcellulose, carboxymethyl cellulose, hydroxethyl cellulose, hydroxpropyl cellulose, cellulose acetate, cellulose diacetate, cellulose triacetate, cellulose acetate-propionate, cellulose acetate-butyrate, nitrocellulose, other cellulose derivatives, or combinations thereof; wherein the polyol plasticizer is a pectin or glycerol.

In some embodiments, the composition of the present application for producing an alginate-based fiber for textile application comprises an alginate, a cellulose and a polyol plasticizer, wherein the cellulose is methyl cellulose, wherein the polyol plasticizer is glycerol, wherein the composition further comprises calcium.

Without being limited by any particular theory, it is believed that the addition of a plasticizer reduces brittleness, thereby increasing the strength and rigidity. Non-limiting examples of plasticizers include a hydrophilic or hydrophobic polyol. In some embodiments, a provided polyol is a C1-3 polyol. In some embodiments, the C1-3 polyol is glycerol. In some embodiments, a provided polyol is a C4-7 polyol. In one embodiment, the C4-7 polyol is sorbitol. In some embodiments, the C4-7 polyol is selected from propylene glycol, diethylene glycol and polyethylene glycols in the molecular weight range of 200-400 atomic mass units.

Other non-limiting embodiments of plasticizers include polyhydric alcohols such as glycerin, Sorbitol, ethylene glycol, propylene glycol, and polyethylene glycol. In some embodiments, the plasticizer is non-toxic and does not affect the solubility of the gel-forming polymer. In some embodiments, the plasticizer is ethylene glycol and polyethylene glycol. In some embodiments, the plasticizer is include sorbitol and glycerin. Glycerin and sorbitol are bio compatible and do not affect the solubility of alginate.

In some embodiments, the combined concentrations of the alginate and the cellulose in the composition is in the range of from 0.05 M to 1 M. In some embodiments, the combined concentrations of the alginate and the cellulose in the composition is in the range of from 0.1 M to 0.8 M. In some embodiments, the combined concentrations of the alginate, the cellulose, and the polyol plasticizer in the composition is in the range of from 0.05 M to 1 M. In some embodiments, the combined concentrations of the alginate, the cellulose, and the polyol plasticizer in the composition is in the range of from 0.1 M to 0.8 M. The components of the composition of the present application are blended together to form a hydrogel which is then electrospun or extruded through a small aperture, such as a syringe or a microfluidic cell, into a coagulation bath or a curing bath, wherein a total concentration of a paste of the curing bath is in the range of 0.01-1 M. In some embodiments, a total concentration of a paste of the curing bath is in the range of 0.2-0.4 M. In some embodiments, a total concentration of a paste of the curing bath is in the range of 0.12-0.2 M. In some embodiments, a total concentration of a paste of the curing bath is in the range of 0.2 M. In some embodiments, the hydrogel is extruded into a curing bath to form an alginate-based fiber, wherein the curing bath comprises calcium. In some embodiments, the curing bath comprises calcium in the concentration of 0.05-0.5 M. In some embodiments, the curing bath comprises calcium in the concentration of 0.05-0.07 M. In some embodiments, the curing bath comprises calcium in the concentration of 0.08-0.15 M. In some embodiments, the curing bath comprises calcium in the concentration of 0.12-0.15 M. The curing bath stabilizes the hydrogel into film or continuous filaments.

Calcium alginate can be utilized for its hygroscopicity, particularly for biomedical applications, and combined with other materials to increase hygroscopicity. The present application provides the unexpected advantages of the utilization of polysaccharide and polyol biopolymer composites with reduced hygroscopicity, achieved in part by enzyme and lecithin surface treatments, and enhanced strength and flexibility to withstand industrial textile processing equipment. Coloration of the alginate-based fiber of the present application is also achieved through non-toxic pigments incorporated directly into the hydrogel dope without the water demands and toxicities associated with conventional dip dye methods and synthetic dye chemicals.

Some embodiments of the present application provide alginate-based fiber, filament, yarn, or textile which has unexpected excellent mechanical integrity and can be used in a range of industries with the ability to dramatically reduce the environmental damages caused by textile related industries and operate within a closed-loop life cycle. The alginate-based fiber, filament, yarn, or textile of the present application is both strong and hypercompostable. The yarns which are made using alginates derived from seaweed are 100% plant-based, negating the need for harmful chemical usage throughout production. Designed to fit into the existing textile industry, the alginate-based yarns readily absorb pigments using sustainable dye methods, reducing the need for excess chemical and water usage. The alginate utilized in the present application can be obtained from kelp. Kelp is a type of seaweed, or macroalgae, that is grown globally in cold coastal waters primarily in the northern hemisphere. The alginate-based fiber, filament, yarn, or textile of the present application provides several advantages over petroleum and agricultural based textiles. In particular, kelp is one of the fastest growing and most rapidly replenishing organisms on earth. The growth of kelp does not utilize harmful fertilizers and pesticides, does not use arable land, and does not use fresh water for drinking or irrigation. Kelp can efficiently sequester carbon/$CO_2$ while filtering surrounding water. Farming kelp rebuilds economic and ecological communities affected by overfishing and pollution by providing a new income source and improving marine habitats.

Additional Embodiments

In some embodiments, an alginate composition is provided. In some embodiments, the alginate composition comprises sodium alginate, methyl cellulose, and a polyol plasticizer. The polyol plasticizer is a glycerol, an amount of methyl cellulose is about 50 wt % to about 90 wt % of sodium alginate, an amount of sodium alginate ranges from about 3.75 wt % to about 7.85 wt % of the total mass, and an amount of glycerol ranges from about 25 wt % to about 250 wt % of a total amount of sodium alginate and methyl cellulose.

In some embodiments, the amount of methyl cellulose is about 50 wt % to about 90 wt % of sodium alginate. In some embodiments, the amount of methyl cellulose is about 55 wt % to about 85 wt % of sodium alginate. In some embodiments, the amount of methyl cellulose is about 60 wt % to about 80 wt % of methyl cellulose. In some embodiments, the amount of methyl cellulose is about 65 wt % to about 75 wt % of sodium alginate. In some embodiments, the amount of methyl cellulose is about 50, 52.5, 55, 57.5, 60, 62.5, 65, 67.5, 70, 72.5, 75, 77.5, or 80 wt % of sodium alginate, or within a range defined by any two of the aforementioned values.

In some embodiments of the alginate composition, the amount of sodium alginate is about 5.75 wt % of the total mass. In some embodiments, the amount of sodium alginate is about 3.75, 4, 4.5, 5, 5.5, 6, 6.5, 7, 7.5, or 7.85 wt % of the total mass, or within a range defined by any two of the aforementioned values.

In some embodiments, the amount of glycerol ranges from about 25 wt % to about 250 wt % of a total amount of sodium alginate and methyl cellulose. In some embodiments, the amount of glycerol ranges from about 50 wt % to about 250 wt % of a total amount of sodium alginate and methyl cellulose. In some embodiments, the amount of glycerol ranges from about 100 wt % to about 250 wt % of a total amount of sodium alginate and methyl cellulose. In some embodiments, the amount of glycerol ranges from about 150 wt % to about 250 wt % of a total amount of sodium alginate and methyl cellulose. In some embodiments, the amount of glycerol ranges from about 200 wt % to about 250 wt % of a total amount of sodium alginate and methyl cellulose. In some embodiments, the amount of glycerol is about 25, 50, 75, 100, 125, 150, 175, 200, 225, or 250 wt % of a total amount of sodium alginate and methyl cellulose, or within a range defined by any two of the aforementioned values.

In some embodiments of the alginate composition, the alginate has a purity of 80% or more. In some embodiments, the alginate has a purity of 80, 85, 90, 91, 92, 93, 94, 95, 99.80, 99.85, 99.90, 99.95, 99.96, 99.97, 99.98, 99.99% or more, or within a range defined by any two of the aforementioned values. In some embodiments, the alginate has a purity of 100%.

In some embodiments, a fiber produced from an alginate composition is provided. In some embodiments, the fiber is produced using an alginate composition comprising sodium alginate, methyl cellulose, and a polyol plasticizer. The polyol plasticizer is a glycerol, an amount of methyl cellulose is about 50 wt % to about 90 wt % of sodium alginate, an amount of sodium alginate ranges from about 3.75 wt % to about 7.85 wt % of the total mass, and an amount of glycerol ranges from about 25 wt % to about 250 wt % of a total amount of sodium alginate and methyl cellulose. The fiber is produced by curing the alginate composition in a curing bath, is produced through extrusion. In some embodiments, the fiber has a tensile strength of at least about 0.1 grams/denier to about 0.8 grams/denier.

In some embodiments, the amount of methyl cellulose is about 50 wt % to about 90 wt % of sodium alginate. In some embodiments, the amount of methyl cellulose is about 55 wt % to about 85 wt % of sodium alginate. In some embodiments, the amount of methyl cellulose is about 60 wt % to about 80 wt % of methyl cellulose. In some embodiments, the amount of methyl cellulose is about 65 wt % to about 75 wt % of sodium alginate. In some embodiments, the amount of methyl cellulose is about 50, 52.5, 55, 57.5, 60, 62.5, 65, 67.5, 70, 72.5, 75, 77.5, or 80 wt % of sodium alginate, or within a range defined by any two of the aforementioned values.

In some embodiments of the alginate composition, the amount of sodium alginate is about 5.75 wt % of the total mass. In some embodiments, the amount of sodium alginate is about 3.75, 4, 4.5, 5, 5.5, 6, 6.5, 7, 7.5, or 7.85 wt % of the total mass, or within a range defined by any two of the aforementioned values.

In some embodiments, the amount of glycerol ranges from about 25 wt % to about 250 wt % of a total amount of sodium alginate and methyl cellulose. In some embodiments, the amount of glycerol ranges from about 50 wt % to about 250 wt % of a total amount of sodium alginate and methyl cellulose. In some embodiments, the amount of glycerol ranges from about 100 wt % to about 250 wt % of a total amount of sodium alginate and methyl cellulose. In some embodiments, the amount of glycerol ranges from about 150 wt % to about 250 wt % of a total amount of sodium alginate and methyl cellulose. In some embodiments, the amount of glycerol ranges from about 200 wt % to about 250 wt % of a total amount of sodium alginate and methyl cellulose. In some embodiments, the amount of glycerol is about 25, 50, 75, 100, 125, 150, 175, 200, 225, or 250 wt % of a total amount of sodium alginate and methyl cellulose, or within a range defined by any two of the aforementioned values.

In some embodiments, the tensile strength ranges from about 0.01 grams/denier to about 0.80 grams/denier. In some embodiments, the tensile strength ranges from about 0.05 grams/denier to about 0.40 grams/denier. In some embodiments, the tensile strength ranges from about 0.01 grams/denier to about 0.20 grams/denier. In some embodiments, the tensile strength ranges from about 0.05 grams/denier to about 0.10 grams/denier. In some embodiments, the tensile strength ranges from about 0.1 grams/denier to about 0.5 grams/denier.

Non-limiting examples of cellulose include methyl cellulose, hydroxy propyl methyl cellulose (HPMC), hydroxy propyl cellulose (HPC), and hydroxyl ethyl cellulose (HEC). In some embodiments, the cellulose is methyl cellulose.

In some embodiments, of the fiber, the curing bath comprises water and calcium chloride.

In some embodiments of the fiber, water is deionized or distilled. In some embodiments, of the fiber, water is deionized. In some embodiments, of the fiber, water is distilled. In some embodiments, of the fiber, water is distilled and deionized.

In some embodiments of the fiber, an amount of calcium chloride ranges from about 0.08 M to about 0.15 M. In some embodiments of the fiber, an amount of calcium chloride is about 0.08, 0.09, 0.10, 0.11, 0.12, 0.13, 0.14, or 0.15 M, or within a range defined by any two of the aforementioned values. In some embodiments of the fiber, the amount of calcium chloride is about 0.12 M.

In some embodiments of the fiber, a calcium content in the fiber ranges from about 2.5 wt % to about 5.25 wt %.

In some embodiments, a fabric containing a fiber is provided. In some embodiments, the fabric contains a fiber produced using an alginate composition comprising sodium alginate, methyl cellulose, and a polyol plasticizer. The polyol plasticizer is a glycerol, an amount of methyl cellulose is about 50 wt % to about 90 wt % of sodium alginate, an amount of sodium alginate ranges from about 3.75 wt % to about 7.85 wt % of the total mass, and an amount of glycerol ranges from about 25 wt % to about 250 wt % of a total amount of sodium alginate and methyl cellulose. The fiber is produced by curing the alginate composition in a curing bath, is produced through extrusion.

In some embodiments, the resulting fiber has a tensile strength of at least about 0.1 grams/denier to about 0.8 grams/denier. In some embodiments, the fiber is contained within a yarn, a knit, or a woven textile.

In some embodiments, the amount of methyl cellulose is about 50 wt % to about 90 wt % of sodium alginate. In some embodiments, the amount of methyl cellulose is about 55 wt % to about 85 wt % of sodium alginate. In some embodiments, the amount of methyl cellulose is about 60 wt % to about 80 wt % of methyl cellulose. In some embodiments, the amount of methyl cellulose is about 65 wt % to about 75 wt % of sodium alginate. In some embodiments, the amount of methyl cellulose is about 50, 52.5, 55, 57.5, 60, 62.5, 65, 67.5, 70, 72.5, 75, 77.5, or 80 wt % of sodium alginate, or within a range defined by any two of the aforementioned values.

In some embodiments of the alginate composition, the amount of sodium alginate is about 5.75 wt % of the total mass. In some embodiments, the amount of sodium alginate is about 3.75, 4, 4.5, 5, 5.5, 6, 6.5, 7, 7.5, or 7.85 wt % of the total mass, or within a range defined by any two of the aforementioned values.

In some embodiments, the amount of glycerol ranges from about 25 wt % to about 250 wt % of a total amount of sodium alginate and methyl cellulose. In some embodiments, the amount of glycerol ranges from about 50 wt % to about 250 wt % of a total amount of sodium alginate and methyl cellulose. In some embodiments, the amount of glycerol ranges from about 100 wt % to about 250 wt % of a total amount of sodium alginate and methyl cellulose. In some embodiments, the amount of glycerol ranges from about 150 wt % to about 250 wt % of a total amount of sodium alginate and methyl cellulose. In some embodiments, the amount of glycerol ranges from about 200 wt % to about 250 wt % of a total amount of sodium alginate and methyl cellulose. In some embodiments, the amount of glycerol is about 25, 50, 75, 100, 125, 150, 175, 200, 225, or 250 wt % of a total amount of sodium alginate and methyl cellulose, or within a range defined by any two of the aforementioned values.

In some embodiments, the tensile strength ranges from about 0.01 grams/denier to about 0.80 grams/denier. In some embodiments, the tensile strength ranges from about 0.05 grams/denier to about 0.40 grams/denier. In some embodiments, the tensile strength ranges from about 0.01 grams/denier to about 0.20 grams/denier. In some embodiments, the tensile strength ranges from about 0.05 grams/denier to about 0.10 grams/denier. In some embodiments, the tensile strength ranges from about 0.1 grams/denier to about 0.5 grams/denier.

In some embodiments, tensile mechanical properties of the extruded alginate fibers are obtained as explained in Example 1. In some embodiments, tensile mechanical properties of the extruded alginate fibers are obtained at ambient temperatures and ambient humidity. In some embodiments, ambient temperatures ranges between 20 and 25 degrees Celsius. In some embodiments, ambient temperatures ranges between 20 and 22.5 degrees Celsius. In some embodiments, ambient temperatures ranges between 22.5 and 25 degrees Celsius. In some embodiments, ambient temperatures ranges between 20 and 25 degrees Celsius±10%. In some embodiments, ambient temperatures ranges between 20 and 22.5 degrees Celsius±10%. In some embodiments, ambient temperatures ranges between 22.5 and 25 degrees Celsius±10%. In some embodiments, ambient humidity ranges between 30 to 50 percent. In some embodiments, ambient humidity ranges between 30 to 40 percent. In some embodiments, ambient humidity ranges between 40 to 50 percent. In some embodiments, ambient humidity ranges between 30 to 50 percent 10%. In some embodiments, ambient humidity ranges between 30 to 40 percent±10%. In some embodiments, ambient humidity ranges between 40 to 50 percent±10%.

In some embodiments, a woven fabric from the fiber can be used as would be (or combined with) burlap, linen or flax, wool, cotton, hemp, silk and rayon.

In some embodiments of the fabric, the fabric is contained within an apparel, a garment, a piece of clothing, or other textile items. Non-limiting examples include knitting yarn, felting, bedding, pants, shirts, robes, hats, mitts, scarves, gloves, jumpers, sweaters, suits, coats, underwear, and the like.

Fibers can be classified according to length, with relatively long or textile length fibers being longer than about one-fourth inch and generally between one-half and two one-half inches in length. Textile fibers generally have a length greater than one-fourth inch. Short fibers, for example, papermaking fibers, have a length less than about one-fourth inch. While it is recognized that short fibers are usually substantially less costly than long fibers, it is also recognized in many instances that it is desirable to strengthen a short fiber product by including a blend of long fibers therein.

In some embodiments, the denier of the fibers used may vary over a wide range and may be from 0.5 to 100 Denier depending on the type of fiber employed and the requirements of the nonwoven material.

Without being limited by any particular theory, the choice of fibers will depend on the desired characteristics of the product and as well, its utility. Thus, for example, the product may require one or more characteristics such as tear resistance, abrasion resistance, washability and stretchability, burst strength, absorption or nonabsorption to different liquids, heat sealability, ability to resist delamination, etc., all of which will influence the type of fiber or mixture of fibers to be used.

In some embodiments of the fabric, the fiber is combined with a natural or non-alginate-based synthetic fiber. In some embodiments, the fiber is short. In some embodiments, the fiber is long, In some embodiments, the fiber is bled of short and long fibers.

In some embodiments, a fiber has a cross section that is cylindrical, star-shaped, Y-shaped, bean-shaped, T-section, ribbon shaped, oval, triangular, square, rectangular, pentagonal, hexagonal, heptagonal, octagonal, nonagonal, decagonal, crenulated (i.e., wary or serrated), lima bean serrated, lima bean smooth, circular serrated, lobular, trilobal, multilobal, polygonal, dog-bone, scalloped oval, kidney shaped, hollow, solid, circular, elliptical, and the like. In some embodiments, the fiber has shape memory. In some embodiments, the fiber is deformable. In some embodiments, a fabric surface is provided from the pile, the pile fibers from two monomers fiber filaments intersect to form reverse-eight shape.

In some embodiments, fibers can have a cross-section (e.g., a transverse cross-section) with a multilobal shape (e.g., a trilobal, quadrulobal, pentalobal, or octalobal shape). In some embodiments, fibers can have an average diameter ranging from about 130 µm to about 260 µm. In some embodiments, fibers can have an average diameter ranging from about 100 µm to about 300 µm. In some embodiments, fibers can have an average diameter of about 100, 105, 115, 125, 135, 145, 155, 165, 175, 185, 195, 200, 215, 225, 235, 250, 275, 290, or 300 µm, or with a range defined by any two of the aforementioned values. The diameter of a multilobal fiber refers to the distance from the tip of a lobe across the center of the cross-section to the end of the cross-section on the other side of the center. In some embodiments, fibers having the size described above can have a linear mass density ranging from at most about 2.4 dtex (e.g., at most about 2.2 dtex, at most about 2.0 dtex, at most about 1.8 dtex, or at most about 1.6 dtex) to at least about 0.45 dtex (e.g., at least about 0.54 dtex, at least about 0.63 dtex, at least about 0.72 dtex, at least about 0.81 dtex, or at least about 0.9 dtex). In some embodiments, fibers having a multilobal cross-section can have a linear mass density of between about 1.6 dtex and about 2.2 dtex. Without being limited by any particular theory, it is believed that, as fibers with a multilobal cross-section have a larger surface area per unit weight than that of fibers with a circular cross-section, the former fibers with a relatively small dimension (e.g., a relatively small diameter or a relatively small linear mass density) can be used to prepare a nonwoven fabric with a surface uniformity similar to that of the nonwoven fabric prepared by the latter fibers with a relatively large dimension (e.g., a relatively large diameter or linear mass density). As a result, the nonwoven fabric prepared by the former fibers can have a better filtration efficiency and a higher tensile strength than those of the nonwoven fabric prepared by the latter fibers.

In some embodiments of the fabric, the fiber comprises a dye using a dip-dying or dope-dying process.

In some embodiments, a film produced from an alginate composition is provided. In some embodiments, the film is produced using an alginate composition comprising sodium alginate, methyl cellulose, and a polyol plasticizer. The polyol plasticizer is a glycerol an amount of methyl cellulose is about 50 wt % to about 90 wt % of sodium alginate, an amount of sodium alginate ranges from about 3.75 wt % to about 7.85 wt % of the total mass, and an amount of glycerol ranges from about 25 wt % to about 250 wt % of a total amount of sodium alginate and methyl cellulose.

In some embodiments, the amount of methyl cellulose is about 50 wt % to about 90 wt % of sodium alginate. In some embodiments, the amount of methyl cellulose is about 55 wt % to about 85 wt % of sodium alginate. In some embodiments, the amount of methyl cellulose is about 60 wt % to about 80 wt % of methyl cellulose. In some embodiments, the amount of methyl cellulose is about 65 wt % to about 75 wt % of sodium alginate. In some embodiments, the amount of methyl cellulose is about 50, 52.5, 55, 57.5, 60, 62.5, 65, 67.5, 70, 72.5, 75, 77.5, or 80 wt % of sodium alginate, or within a range defined by any two of the aforementioned values.

In some embodiments of the alginate composition, the amount of sodium alginate is about 5.75 wt % of the total mass. In some embodiments, the amount of sodium alginate is about 3.75, 4, 4.5, 5, 5.5, 6, 6.5, 7, 7.5, or 7.85 wt % of the total mass, or within a range defined by any two of the aforementioned values.

In some embodiments, the amount of glycerol ranges from about 25 wt % to about 250 wt % of a total amount of sodium alginate and methyl cellulose. In some embodiments, the amount of glycerol ranges from about 50 wt % to about 250 wt % of a total amount of sodium alginate and methyl cellulose. In some embodiments, the amount of glycerol ranges from about 100 wt % to about 250 wt % of a total amount of sodium alginate and methyl cellulose. In some embodiments, the amount of glycerol ranges from about 150 wt % to about 250 wt % of a total amount of sodium alginate and methyl cellulose. In some embodiments, the amount of glycerol ranges from about 200 wt % to about 250 wt % of a total amount of sodium alginate and methyl cellulose. In some embodiments, the amount of glycerol is about 25, 50, 75, 100, 125, 150, 175, 200, 225, or 250 wt % of a total amount of sodium alginate and methyl cellulose, or within a range defined by any two of the aforementioned values.

In some embodiments, provided herein are alginate-based fibers from biomaterials that can be used as sustainable bio-based textile alternatives for the applications in footwear, apparel, accessories, packaging, and furniture industries. Alginates and other polysaccharides are used to produce fibers which can be used as a textile or compostable alternative to petrochemical based polymers in a range of applications. The alginate-based fiber of the present application provides excellent strength and flexibility in its unhydrated state for textile applications.

In some embodiments, provided herein is a composition for producing an alginate-based fiber for textile application comprising an alginate, a cellulose and a polyol plasticizer, wherein the fiber is produced through extrusion in a curing bath. In some embodiments, the composition of the present application comprises an alginate, a cellulose and a polyol plasticizer, wherein the polyol plasticizer is a glycerol or pectin, wherein the cellulose is methylcellulose, ethylcellulose, carboxymethyl cellulose, hydroxethyl cellulose, hydroxpropyl cellulose, cellulose acetate, cellulose diac-etate, cellulose triacetate, cellulose acetate-propionate, cel-lulose acetate-butyrate, nitrocellulose, other cellulose derivative, or combinations thereof, wherein the alginate is a low molecular weight alginate or a high molecular weight alginate, wherein the curing bath comprises 0.05-0.5 M calcium. In some embodiments, the cellulose is a methyl-cellulose. In some embodiments, the composition further comprising calcium. In some embodiments, a concentration of a paste of the curing bath is 0.01-1 M. In some embodi-ments, a combined concentration of the alginate, the cellu-lose, and the polyol plasticizer is from 0.05 M to 1 M, or from 0.1 M to 0.8 M.

The present application also provide an alginate-based fiber produced using the composition of the present appli-cation, wherein the alginate-based fiber is used to produce yarn, knit or woven textiles, wherein the yarn is used to produce apparel, garment, or clothing. In some embodi-ments, the alginate-based fiber of the present application has a tensile strength of up to 0.8 grams/denier, wherein the fiber is spinning together with a natural or non-alginate-based synthetic fiber, wherein the fiber is colored with a dye using a dip-dying or dope-dying process.

In some embodiments, a composition for producing an alginate-based fiber for textile application comprises an alginate, a cellulose and a polyol plasticizer. The fiber is produced in a curing bath.

In some embodiments of the composition, the fiber is produced through extrusion.

In some embodiments of the composition, the polyol plasticizer is a glyceol or pectin.

In some embodiments of the composition, the cellulose is methylcellulose, ethylcellulose, carboxymethyl cellulose, hydroxethyl cellulose, hydroxpropyl cellulose, cellulose acetate, cellulose diacetate, cellulose triacetate, cellulose acetate-propionate, cellulose acetate-butyrate, nitrocellu-lose, other cellulose derivative, or combinations thereof.

In some embodiments of the composition, the cellulose is a methylcellulose.

In some embodiments of the composition, the alginate is a low molecular weight alginate or a high molecular weight alginate. In some embodiments of the composition, the alginate is a low molecular weight alginate. In some embodi-ments of the composition, the alginate is a high molecular weight alginate.

In some embodiments of the composition, the composi-tion further comprising calcium.

In some embodiments of the composition, the curing bath comprises 0.05-0.5 M calcium.

In some embodiments of the composition, a combined concentration of the alginate, the cellulose, and the polyol plasticizer is from 0.05 M to 1 M, or from 0.1 M to 0.8 M.

In some embodiments of the composition, a concentration of a paste of the curing bath is 0.01-1 M.

In some embodiments, an alginate-based fiber produced using a composition comprising an alginate, a cellulose and a polyol plasticizer is provided. In some embodiments, alginate-based fiber is used to produce yarn, knit or woven textiles.

In some embodiments of the fiber, the yarn is used to produce apparel, garment, or clothing.

In some embodiments of the fiber, the fiber has a tensile strength of up to 0.8 grams/denier.

In some embodiments of the fiber, the fiber is spun together with a natural or non-alginate-based synthetic fiber.

In some embodiments of the fiber, the fiber is colored with a dye using a dip-dying or dope-dying process.

EXAMPLES

The features and improved properties of these tissue grafts are shown in the examples which illustrate the benefits and advantages of the present invention.

Example 1. Preparation of Alginate-Based Fibers

Alginate-based electrospinning solutions were prepared by dissolving low viscosity (LV) alginate with various amounts of cellulose, calcium chloride, graphite, phosphate buffered saline (PBS), or glycerol in water or deionized water. Cellulose or methyl cellulose was incorporated as a copolymer. Calcium chloride dihydrate, PBS, glycerol, and graphite were used as electrospinning aids. Alginic acid sodium salt with very low viscosity (LV) was obtained from Alfa Aesar (Ward Hill, MA).

LV alginate-cellulose-$CaCl_2$ solutions were prepared by first dissolving calcium chloride in water followed by incor-poration of various polymer concentrations. For alginate-cellulose-graphite solutions, graphite flakes were first soni-cated in water for 48 hours, followed by addition of the polymers. Resulting solutions were mixed overnight on a rocker to ensure a homogenous polymer distribution. In addition, LV alginate-glycerol solutions were prepared by adding varying alginate concentrations to a 2:1 ratio of glycerol to deionized water. The blend ratios and concen-trations of alginate are shown in tables 1, 2, and 3. Table 1 shows the ratios and concentrations of LV alginate with cellulose and calcium chloride in the electrospinning solu-tions. The concentration of LV alginate was 1.5% w/v or 3% w/v. The concentration of cellulose was 1.5% w/v or 3% w/v. The concentration of calcium chloride ($CaCl_2$)) was 0.03% w/v, 0.06% w/v, or 1.5% w/v.

Table 2 shows ratios and concentrations of LV alginate with cellulose and graphite in the electrospinning solutions. Table 3 shows ratios and concentrations of LV alginate either with PBS or a glycerol in the electrospinning solutions.

The electrospinning setup consisted of a 40-kV high voltage generator, a syringe pump, and a stationary collec-tion plate covered with aluminum foil. Each solution was drawn through the needle tip (18½ gauge) at a flow rate between 0.75-4 mL/hr. A high voltage between 15-25 kV was used, with the distance from the needle tip to the collector kept constant at 15 cm.

All alginate-based electrospinning solutions that included methyl cellulose, calcium chloride, graphite, PBS, or glyc-erol were unable to be electrospun into fibers. Tables 1, 2, and 3 show that the electrospinning solutions either pro-duced droplets onto the collecting plate or were too viscous to be electrospun.

Alginate-based extrusion solutions were prepared using high viscosity (HV) alginic acid sodium salt (Alfa Aesar, Ward Hill, MA) in addition to the very low viscosity alginic acid sodium salt. Methyl cellulose was used as a copolymer. Both LV and HV alginate were dissolved separately with methyl cellulose in deionized water to create 0.25M (total polymer, calculated by the repeat unit molecular weight) solutions. A 0.12M calcium chloride dihydrate solution was prepared in deionized water. The blend ratio and concentra-tion are as shown in Table 4.

LV and HV alginate fibers were extruded using a 5 mL syringe with an 18½ gauge needle. The tip of the needle was submerged into a calcium chloride bath ten times the volume of the alginate solution. Extruded fibers were immersed in the bath for an hour, then washed two times with deionized water to remove calcium ions. Alginate fibers were left to dry overnight at room temperature.

Extruded LV and HV alginate microfibers were sputter-coated (Cressington 108 auto) with gold-palladium to reduce charging effects, and imaged with scanning electron micros-copy (SEM, 3 kV, Zeiss) to evaluate fiber morphology. Energy dispersive x-ray analysis (EDXA, 20 keV, Princeton Gamma Tech) was performed to determine scaffold elemental composition. EDXA signal was collected at 200 seconds (life time) up to ~16,000 counts per second (CPS). Resulting spectra were quantified, and representative maps of elemental composition were obtained.

Tensile mechanical properties of the extruded alginate fibers were obtained using an Instron. Single alginate fibers (76 mm length) were wound together to create a 4-ply fiber network for each sample group (n=1). The gauge length was set at 50.8 mm, and the thickness of the fibers was measured using a digital caliper (Mitutoyo, Takatsu-ku, Japan). Tensile mechanical properties of the extruded alginate fibers were obtained at ambient temperatures between 20 and 25 degrees Celsius and ambient humidity between 30 to 50 percent Analysis of tensile mechanical properties (Young's modu-lus, maximum stress and toughness) was performed using MatLab software. Briefly, a stress vs. strain graph was generated for each sample (FIG. 4) by evaluating the force per area (stress) and elongation per original length (strain) in MatLab. The linear region of each graph was selected, and the slope of the region was determined as the Young's modulus. The maximum stress was found as the topmost inflection point on the graphed curve, and the toughness was determined by finding the area under the curve.

All alginate solutions that included methyl cellulose, calcium chloride, graphite, PBS, or glycerol were unable to be electrospun into fibers. Tables 1, 2, and 3 show the various solutions either produced droplets onto the collect-ing plate or were too viscous to be electrospun. Low and high viscosity (LV and HV, respectively) alginate fibers were successfully extruded with cellulose as a copolymer. The alginate concentration was increased and the methyl cellu-lose concentration was decreased throughout three sample groups, maintaining a total polymer concentration of 0.25M (based on previous studies, data not shown), while ensuring extrudability and minimizing methyl cellulose content in the fibers.

Figure 2:
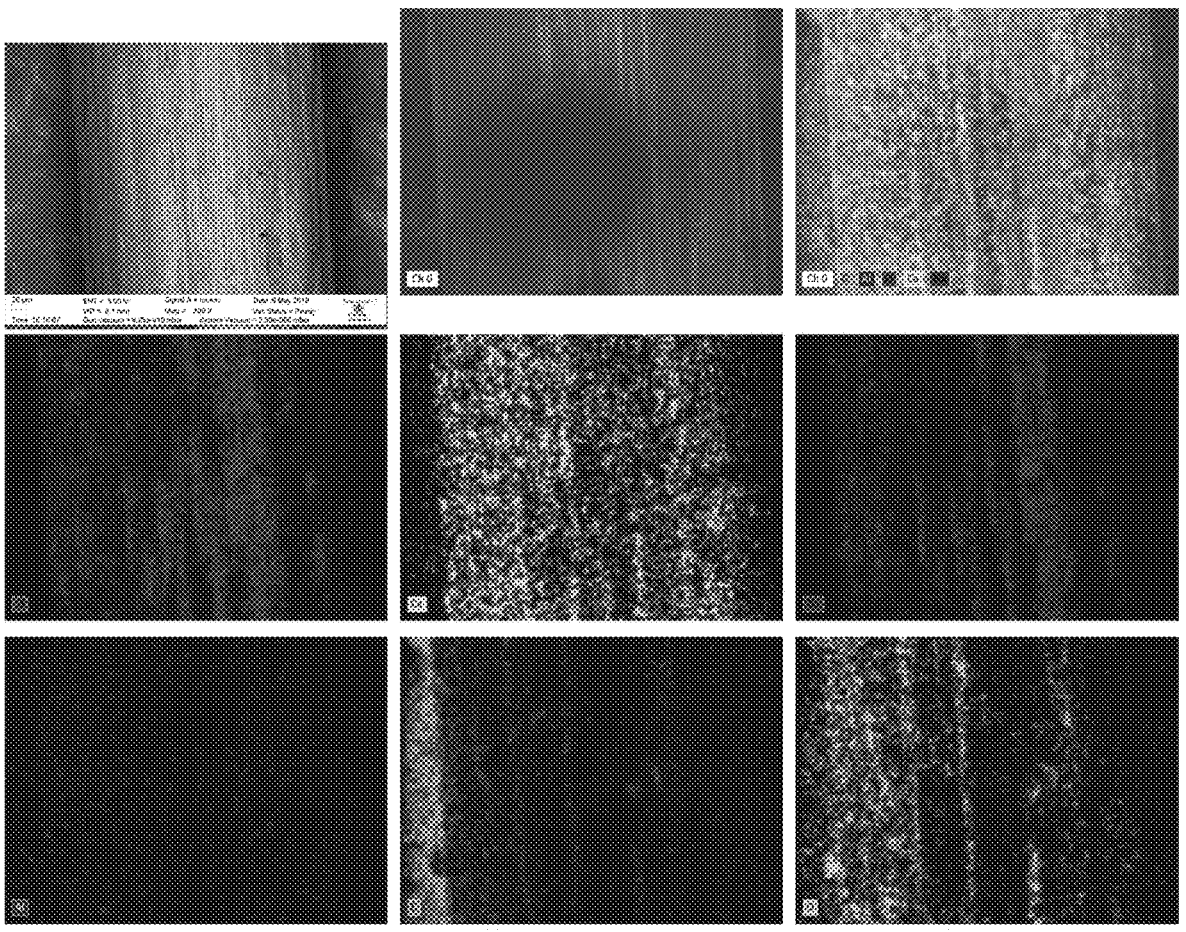
FIG. 2 shows SEM (top left), EDX image (top middle), and elemental composition (remaining) of high viscosity alginate microfibers.
Figure 3:
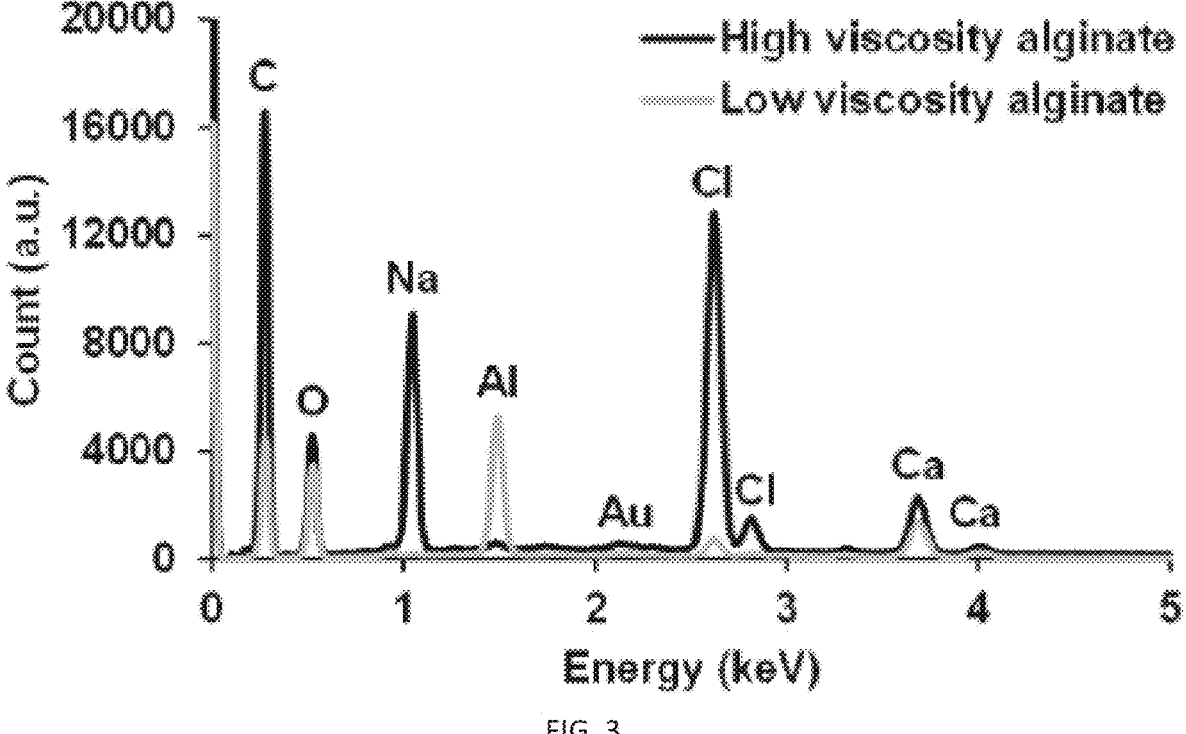
FIG. 3 shows EDXA spectra of extruded low and high viscosity alginate microfibers, showing relative elemental composition.

LV (FIG. 1) and HV (FIG. 2) alginate fibers displayed similar smooth morphology in SEM micrographs, with the low viscosity fibers measuring approximately half the diam-eter of high viscosity fibers (~130 and ~260 µm, respec-tively). Carbon and oxygen were detected on both fibers, emitted from the electron beam. Aluminum was detected from the scope stage, and gold was detected from the fiber coating. Relative element concentrations obtained from spectral peak magnitudes show that, in the LV fibers (FIG. 1), there is almost no sodium present, with small amounts of chlorine and high amounts of calcium covering the fibers. Alternatively, in HV fibers (FIG. 2), chlorine dominates with relatively less calcium present. This is verified by quantify-ing the spectra (FIG. 3, Tables 5 and 6).

Figure 4:
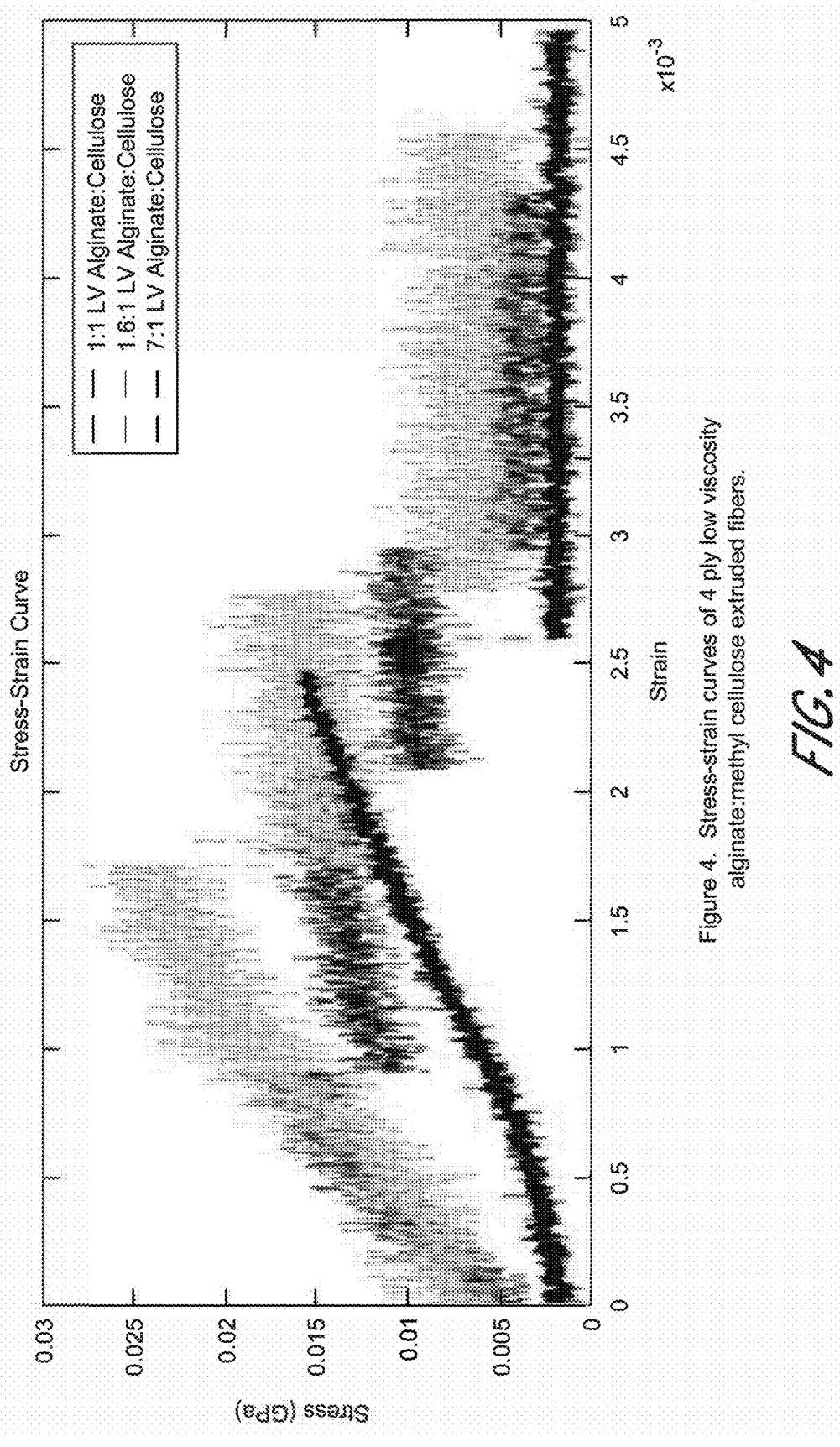
FIG. 4 shows stress-strain curves of 4 ply low viscosity alginate:methyl cellulose extruded fibers.
Figure 5:
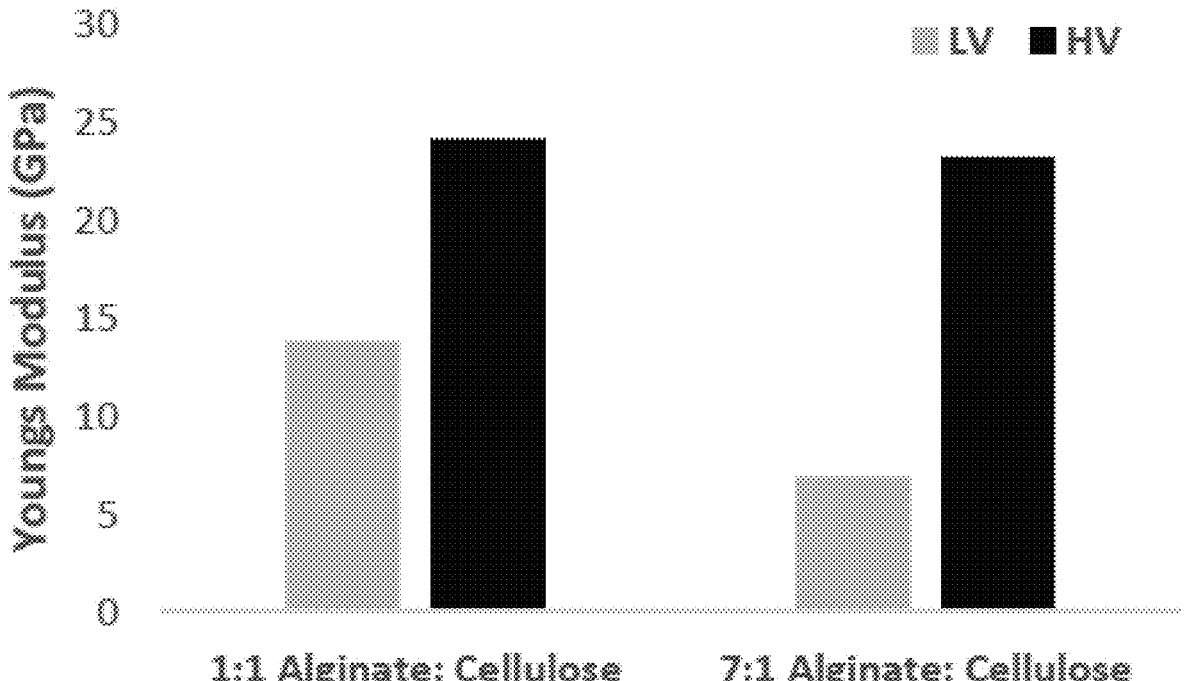
FIG. 5 shows Young's Modulus comparison between low and high viscosity alginate used in 1:1 and 7:1 alginate:methyl cellulose extruded fibers.
Figure 6:
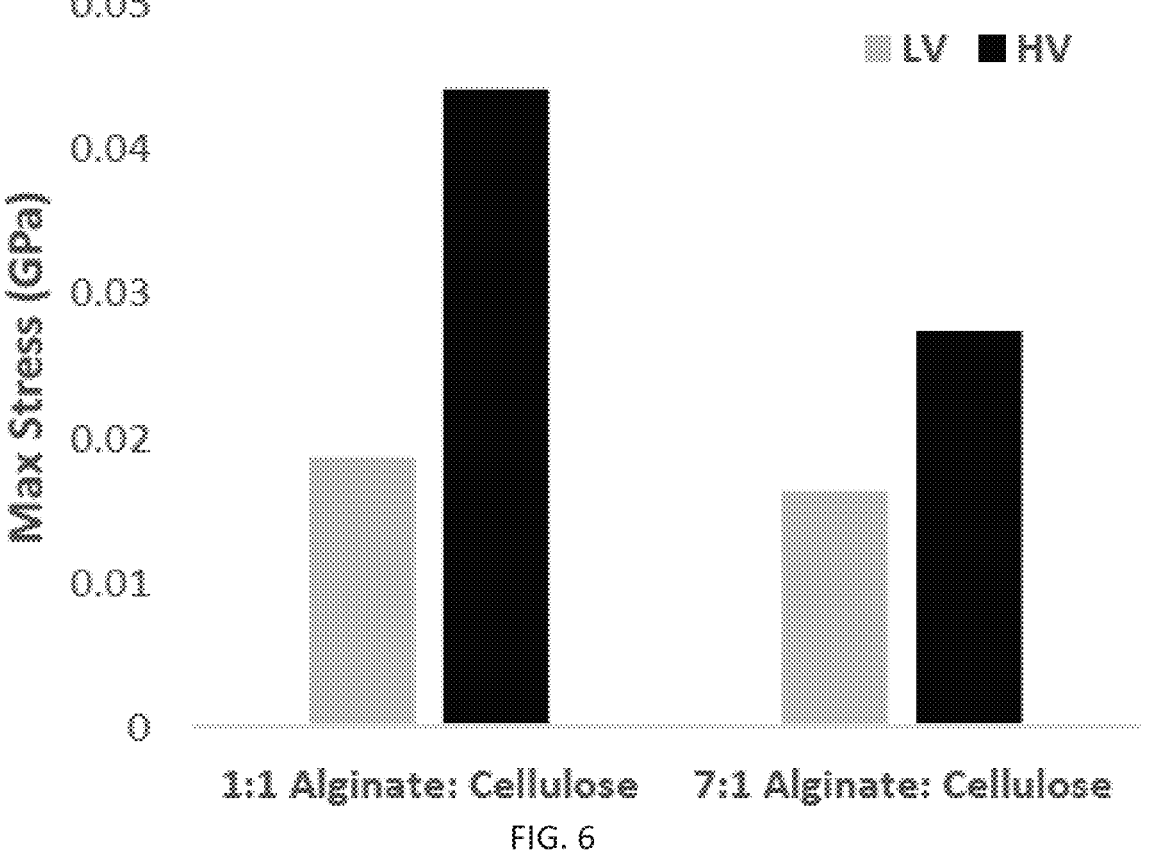
FIG. 6 shows maximum stress comparison between low and high viscosity alginate used in 1:1 and 7:1 alginate:methyl cellulose extruded fibers.
Figure 7:
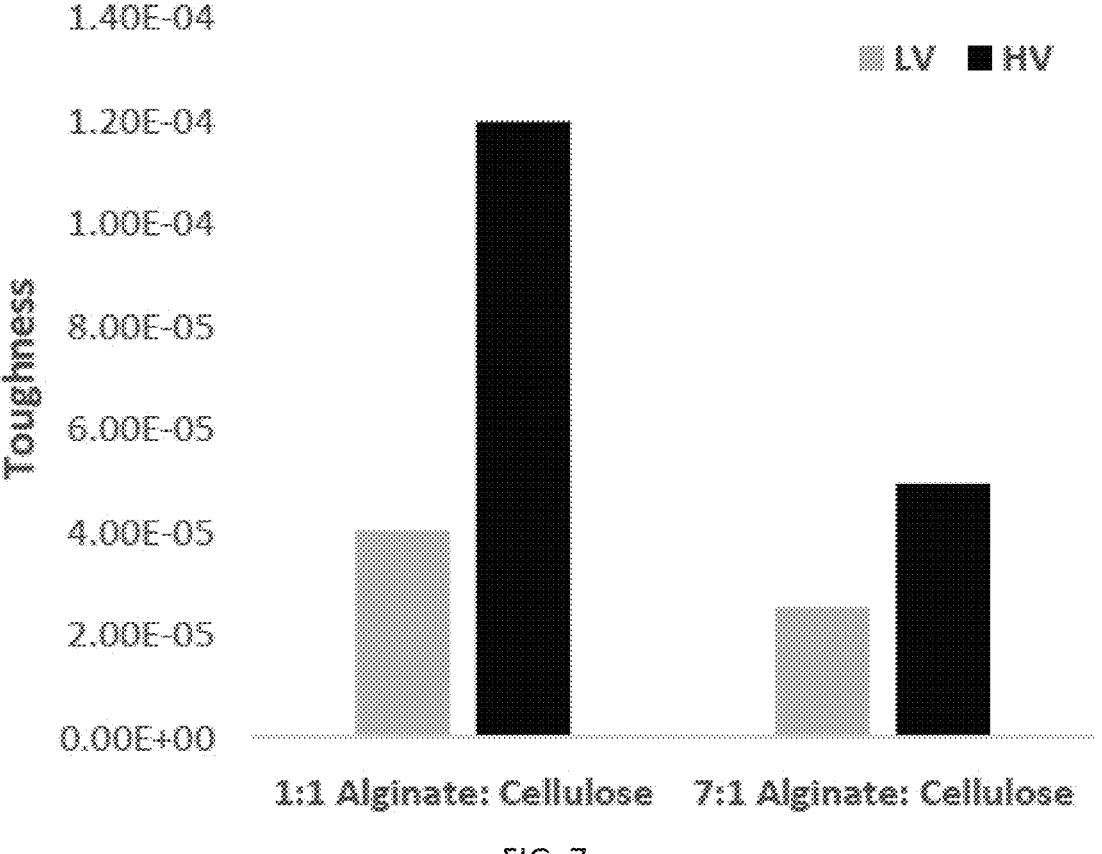
FIG. 7 shows toughness comparison between low and high viscosity alginate used in 1:1 and 7:1 alginate:methyl cellulose extruded fibers.

FIG. 4 shows the stress-strain curves for 4 ply fibers with various ratios of LV alginate to cellulose. As the concentra-tion of LV alginate increased within the 0.25M solution, fibers exhibited lower elastic modulus. As the concentration of LV alginate increased from 0.125M to 0.218M in a 0.25M alginate:cellulose solution, the Young's Modulus and tough-ness of the fibers decreased. The fiber gained more flexibility as more LV alginate was incorporated into the fiber com-pared to cellulose, as determined by strain at failure. The tensile mechanical properties of extruded alginate fibers were further analyzed by comparing LV and HV alginate fibers' properties. FIGS. 5, 6, and 7 show that the use of HV alginate, rather than LV alginate, approximately doubles the Young's modulus, and increases the maximum stress and toughness of the fibers. Similar to the LV alginate, as the concentration of HV alginate increases from 0.125M to 0.218M, the Young's Modulus and toughness of the fibers decreases.

TABLE 1

Ratios and concentrations of low viscosity alginate with cellulose and calcium chloride in the electrospinning solutions.

| MASS IN 2 ML H$_2$O | | | | |
|---|---|---|---|---|
| LOW VISCOSITY ALGINATE (MG) | CELLULOSE (MG) | CACL$_2$ (MG) | ALGINATE CONCENTRATION (W/V) | OBSERVATION |
| 60 | 60 | 1.2 | 3% | SOLUTION GELLED |
| 60 | 60 | — | 3% | SOLUTION GELLED |
| 30 | 30 | 30 | 1.5% | SOLUTION GELLED |
| 30 | 30 | 0.6 | 1.5% | DROPLETS |

TABLE 2

Ratios and concentrations of low viscosity alginate with cellulose
and graphite in the electrospinning solutions.
TABLE 2. Ratios and concentrations of low viscosity alginate with
cellulose and graphite in the electrospinning solutions.

MASS IN 2 ML $H_2O$

| LOW VISCOSITY ALGINATE (MG) | CELLULOSE (MG) | GRAPHITE | CACL$_2$ (MG) | ALGINATE CONCENTRATION (W/V) | OBSERVATION |
|---|---|---|---|---|---|
| 30 | 30 | 3.22% | — | 1.5% | DROPLETS |
| 120 | 30 | 1.32% | — | 6% | DROPLETS |
| 120 | 30 | 1.32% | 13 | 6% | SOLUTION GELLED |
| 600 | — | 0.33% | — | 30% | SOLUTION GELLED |
| 200 | — | 1.00% | — | 10% | DROPLETS |

TABLE 3

Ratios and concentrations of low viscosity alginate either
with PBS or a glycerol in the electrospinning solutions.

| LOW VISCOSITY ALGINATE (MG) | PBS (ML) | GLYCEROL (ML) | DIH$_2$O (ML) | ALGINATE CONCENTRATION (W/V) | OBSERVATION |
|---|---|---|---|---|---|
| 30 | 2 | — | — | 1.5% | DROPLETS |
| 120 | 2 | — | — | 6% | DROPLETS |
| 120 | — | 2 | 1 | 6% | DROPLETS |
| 600 | — | 2 | 1 | 30% | SOLUTION GELLED |

TABLE 4

Ratios and concentration of low viscosity (LV) or high viscosity
(HV) Alginate and Methyl Cellulose in extrusion solutions.

| LV OR HV ALGINATE, METHYL CELLULOSE MOLARITY RATIO | MASS IN 100 ML DIH$_2$O | | |
|---|---|---|---|
| | LV OR HV ALGINATE (G) | CELLULOSE (G) | CONCENTRATION (M) |
| 1:1 (0.125M: 0.125M) | 2.47 | 2.22 | 0.25 |
| 1.6:1^ (0.158M: 0.093M) | 3.09 | 1.66 | 0.25 |

TABLE 4-continued

Ratios and concentration of low viscosity (LV) or high viscosity
(HV) Alginate and Methyl Cellulose in extrusion solutions.

| LV OR HV ALGINATE, METHYL CELLULOSE MOLARITY RATIO | MASS IN 100 ML DIH$_2$O | | |
|---|---|---|---|
| | LV OR HV ALGINATE (G) | CELLULOSE (G) | CONCENTRATION (M) |
| 7:1 (0.218M: 0.031M) | 4.33 | 0.55 | 0.25 |

^A 1.6:1 HIGH VISCOSITY ALGINATE/METHYL CELLULOSE SOLUTION WAS NOT MADE.

TABLE 5

Quantification of relative elemental composition
in extruded low viscosity microfibers.

| Element | At. No. | Netto | Mass [%] | Mass Norm. [%] | Atom [%] | abs. error [%] (1 sigma) | rel. error [%] (1 sigma) |
|---|---|---|---|---|---|---|---|
| Oxygen | 8 | 17483 | 18.07 | 38.09 | 36.14 | 2.38 | 13.16 |
| Carbon | 6 | 19848 | 21.09 | 44.46 | 56.18 | 2.73 | 12.96 |
| Gold | 79 | 287 | 0.95 | 1.99 | 0.15 | 0.09 | 9.73 |
| Calcium | 20 | 13919 | 2.49 | 5.25 | 1.99 | 0.10 | 4.09 |
| Sodium | 11 | 0 | 0.00 | 0.00 | 0.00 | 0.00 | 4.43 |

TABLE 5-continued

| | | | | Mass | | abs. error | rel. error |
| | At. | | Mass | Norm. | Atom | [%] | [%] |
| Element | No. | Netto | [%] | [%] | [%] | (1 sigma) | (1 sigma) |
| --- | --- | --- | --- | --- | --- | --- | --- |
| Chlorine | 17 | 6446 | 0.71 | 1.50 | 0.64 | 0.05 | 7.21 |
| Aluminium | 13 | 36984 | 4.13 | 8.71 | 4.90 | 0.22 | 5.44 |
| | | Sum | 47.44 | 100.00 | 100.00 | | |

Quantification of relative elemental composition in extruded low viscosity microfibers.

TABLE 6

Quantification of relative elemental composition in extruded high viscosity microfibers.

| | | | | Mass | | abs. error | rel. error |
| | At. | | Mass | Norm. | Atom | [%] | [%] |
| Element | No. | Netto | [%] | [%] | [%] | (1 sigma) | (1 sigma) |
| --- | --- | --- | --- | --- | --- | --- | --- |
| Oxygen | 8 | 45516 | 12.77 | 19.91 | 18.16 | 1.54 | 12.07 |
| Carbon | 6 | 133808 | 38.26 | 59.65 | 72.47 | 4.27 | 11.16 |
| Gold | 79 | 1976 | 0.93 | 1.45 | 0.11 | 0.06 | 6.55 |
| Calcium | 20 | 43168 | 1.69 | 2.63 | 0.96 | 0.08 | 4.45 |
| Sodium | 11 | 105567 | 4.51 | 7.03 | 4.46 | 0.32 | 7.01 |
| Chlorine | 17 | 245865 | 5.95 | 9.28 | 3.82 | 0.22 | 3.77 |
| Aluminium | 13 | 1240 | 0.03 | 0.05 | 0.03 | 0.00 | 6.24 |
| | | Sum | 64.14 | 100.00 | 100.00 | | |

Example 2. Chemical Modification on Mechanical Properties of Alginate-Based Fibers for Textile Applications By iterating chemical synthesis, modification and mechanical testing, the alginate-based yarns of the present application have mechanical properties, such as strength, stretch, and toughness, comparable to conventional textile fibers, such as cotton and polyester. The alginate-based yarns are based on kelp, which has the requisite combination of strength and flexibility for industrial knitting machines to enable scalability and a viable commercial product.

The mechanical properties of a series of yarns with different concentrations of the alginate-based composite paste and curing bath were measured. Surprisingly, none of the relations between Young's modulus, maximum stress and the toughness of yarns are linear because three kinds of interactions dominate these three properties, hydrogen bond, the electrical attraction and electrical repulsion. The experimental results showed that the mechanical performances of 0.2 M paste has best results in the bath concentration from 0.12M to 0.2M to achieve best strength and flexibility, since the dominated interaction is determined by the crosslinking density of the yarns as a trade-off between hydrogen bond, electrostatic attraction and Pauli repulsion.

The crosslinking density of fiber is also controlled by the paste concentration. For the 0.3M paste, the dominant interaction is the electrostatic attraction. Because the number of the polymers is higher than that of 0.2M paste, more hydrogen bonds contribute to the higher modulus and the higher maximum stress, which leads to a higher toughness than 0.2M paste despite the lower flexibility compared with 0.2M paste. However, for the 0.4M paste, the hydrogen bonds dominate the interaction. Thus, despite the enhanced maximum stress tolerance, the fiber is too brittle to serve a higher modulus and a higher toughness due to the lack of the crosslinking density.

Considering the feasibility of winding the alginate-based yarns onto knitting cones before dehydration, the best range of the paste is between 0.2M to 0.3M, the best ratio between the concentration of bath and the paste is from 0.6 to 1.

Figure 8:
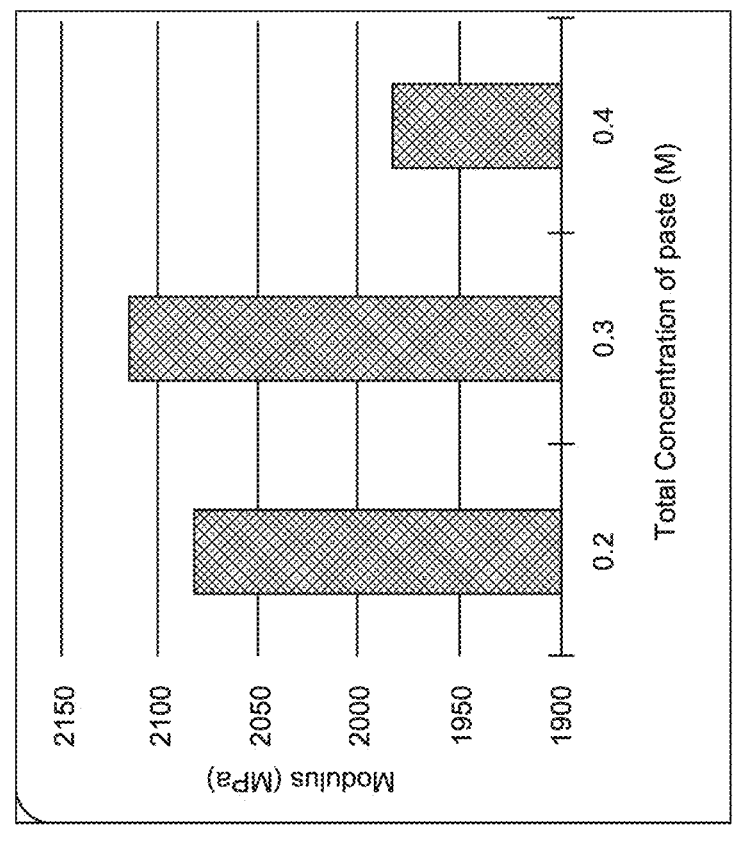
FIG. 8 shows Young's Modulus as a function of calcium concentration in curing bath (left) and biopolymer concentration in hydrogel paste (right).
Figure 8:
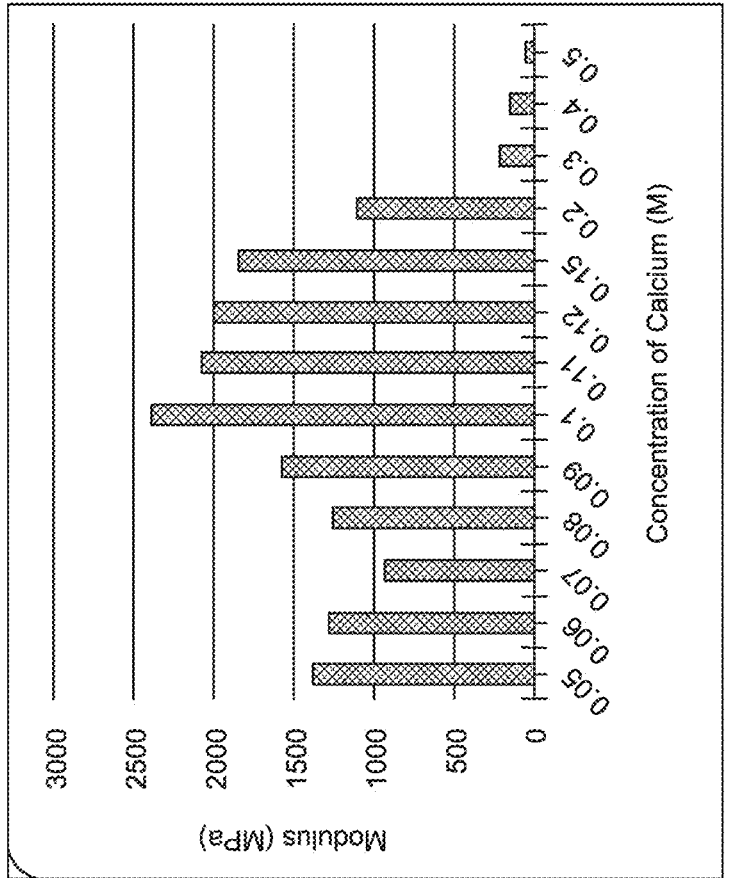
Figure 9:
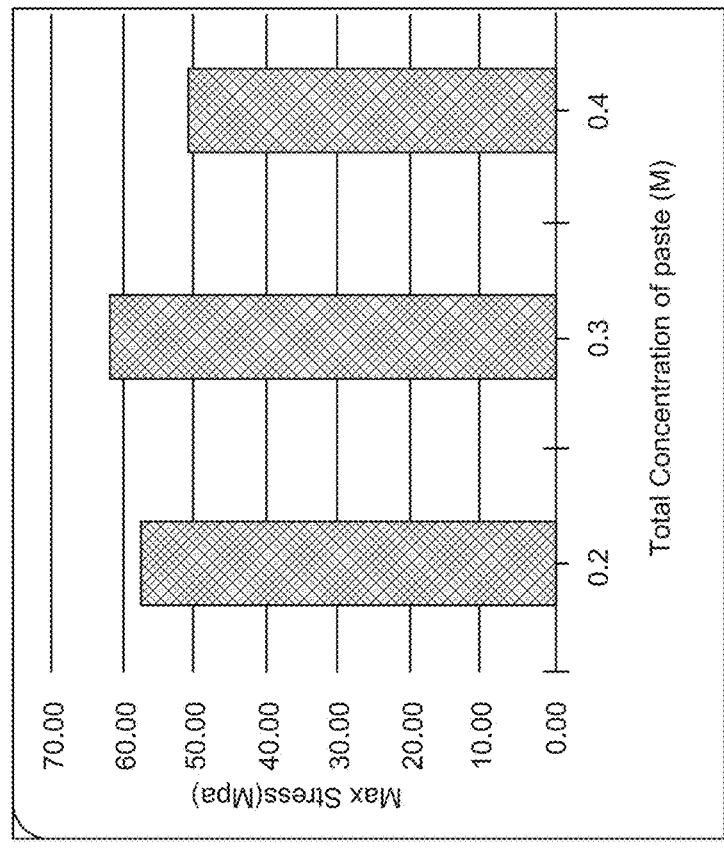
FIG. 9 shows max stress as a function of: calcium concentration in curing bath (left) and biopolymer concentration in hydrogel paste (right).
Figure 9:
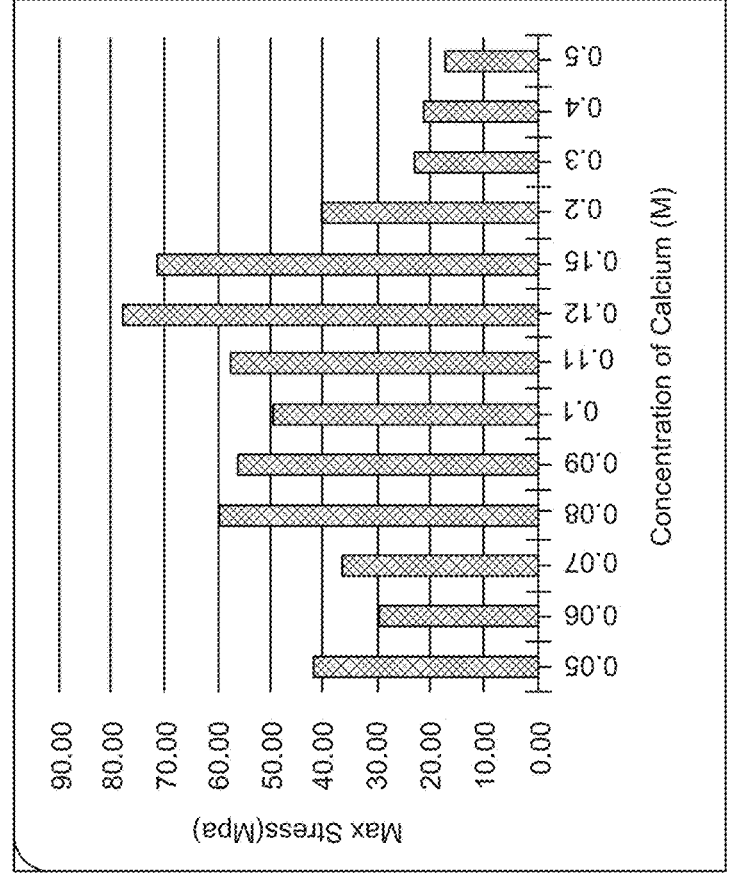
Figure 10:
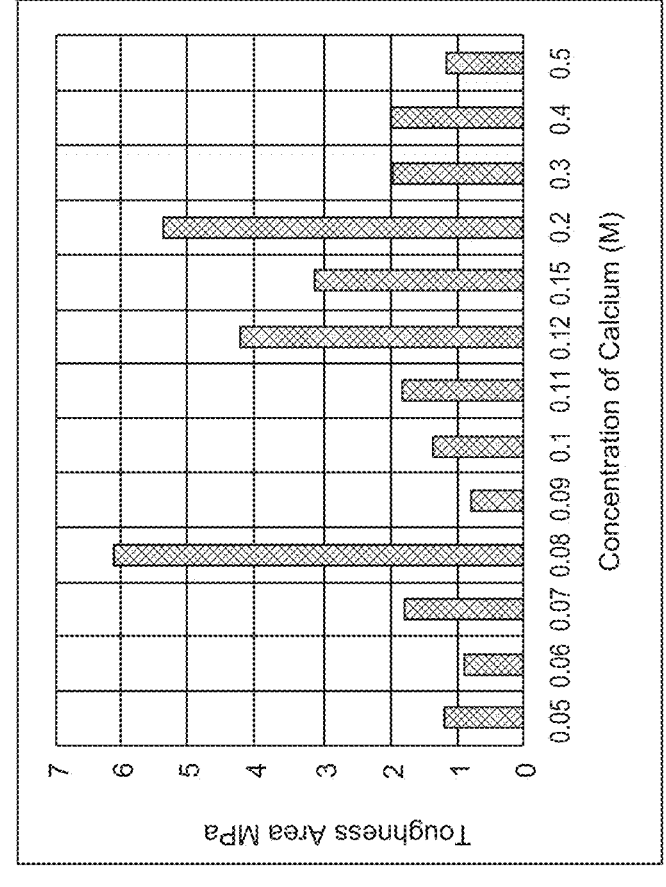
FIG. 10 shows toughness as a function of: calcium concentration in curing bath (left) and biopolymer concentration in hydrogel paste (right).
Figure 10:
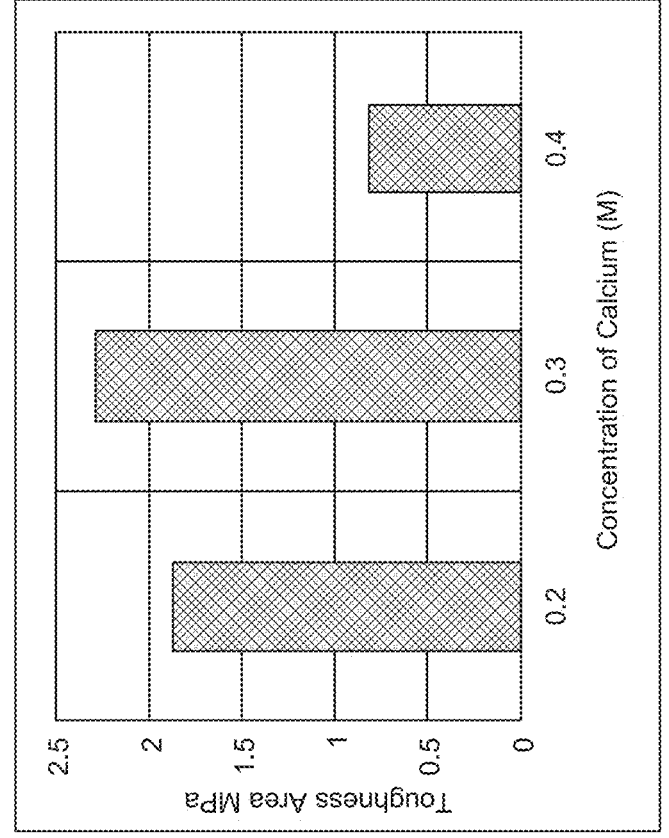

The testing results are shown in FIGS. 8-10. FIG. 8 shows Young's Modulus as a function of calcium concentration in curing bath (top figure) and biopolymer concentration in hydrogel paste (lower figure). FIG. 9 shows max stress as a function of: calcium concentration in curing bath (top figure) and biopolymer concentration in hydrogel paste (lower figure). FIG. 10 shows toughness as a function of: calcium concentration in curing bath (top figure) and biopolymer concentration in hydrogel paste (lower figure).

Example 3. Analysis of the Alginate-Based Fiber Casting Procedure

Reported herein are data of the fiber casting and calculated the dehydration rate between each time interval. Analysis is performed of what factors account for the difference of dehydration processes which affects the properties of the fiber such as strength, flexibility. For a better understanding of this process, described herein are the models of the two key steps: casting and desiccation.

Casting

Casting can be simplified it into a one-dimension mass transport problem. In this problem, the Calcium ion diffuses into the polymer solution (cylinder) and react with the carboxyl group of alginate to exchange the sodium ion out of the fiber. Before modeling, five assumptions should be given to maintain the validity of the model. For one thing, the fiber can be taken as a thin cylinder and use the cylinder coordinate (the three directions are r, $\theta$ and z) to model it. Next, because the fiber is very long and due to the axial symmetry, the concentration profile of Calcium ion in fiber is independent of $\theta$ and z directions. Then, it is assumed that the mole fraction of Calcium ion in this system is so small that the flux of $Ca^{2+}$ can be simplify into $N_{Ca}=-D_{Ca}dC/dr$, where $D_{Ca}$ is the diffusion coefficient of $Ca^{2+}$ which relates to the viscosity of the polymer solution and C is the concentration of $Ca^{2+}$. Further, because the volume of the Calcium chloride solution is much larger than that of the polymer, the change of the bulk concentration of the bath and the difference of concentration at different position of the bath can be neglected, and assume that the time reaching steady state is evanescent. Finally, an approximation is made that the diffusion coefficient $D_{Ca}$ does not change after casting by $Ca^{2+}$.

According to the mass balance equation, at steady state, the concentration profile subordinates the following equation $$\frac{\partial C}{\partial t} = \frac{D_{Ca}}{r}\frac{\partial}{\partial r}\left(r\frac{\partial C}{\partial r}\right) - kC = 0 \tag{1}$$

where k is the reaction constant of casting reaction and C is the concentration profile of $Ca^{2+}$ in fiber. And the boundary conditions are that $$\frac{\partial c}{\partial r}\bigg|_{r=0} = 0 \tag{2}$$

$$C|_{r=R} = C_b \tag{3}$$

where $C_b$ is the bulk concentration of $Ca^{2+}$, R is the radius of the fiber before dehydration.

Then, the variables are scaled by setting $\Theta=C/C_b$, $\xi=r/R$ and $$\phi = \sqrt{\frac{kR^2}{D_{Ca}}},$$

then the equation (1) reduces into $$\frac{1}{\xi}\frac{d}{d\xi}\left(\xi\frac{d\Theta}{d\xi}\right) - \phi^2\Theta = 0 \tag{4}$$

The boundary conditions are $$\frac{\partial\Theta}{\partial\xi}\bigg|_{\xi=0} = 0 \tag{5}$$

$$\Theta|_{\xi=1} = 1 \tag{6}$$

Solve equation (4), to yield $$\Theta=AI_0(\phi\xi)+BK_0(\phi\xi) \tag{7}$$

where A and B are constants to be determined.

Appling equation (5) and (6), the following is obtained:

$$A = \frac{1}{I_0(\phi)} \tag{8}$$

$$B = 0 \tag{9}$$

22

So the scaling concentration profile is that $$\Theta = \frac{I_0(\phi\xi)}{I_0(\phi)} \tag{10}$$

Thus, the Calcium uptake rate is $$\text{Rate} = D_{Ca}\frac{dC}{dr}\bigg|_{r=R} \frac{D_{Ca}C_b}{R}\frac{d\Theta}{d\xi}\bigg|_{\xi=1} = \frac{D_{Ca}C_b\phi}{R}\frac{I_1(\phi)}{I_0(\phi)} \tag{11}$$

In Addition, the process is control by diffusion rather than reaction in order to set, $D_{Ca}\sim0$. So $$\phi = \sqrt{\frac{kR^2}{D_{Ca}}} \sim \infty.$$

According to the property of Bessel function, $$\frac{I_1(\phi)}{I_0(\phi)} \sim 1.$$

Thus, the equation (11) reduces to $$\text{Rate} = \tag{12}$$

$$\frac{D_{Ca}C_b\phi}{R} = \frac{D_{Ca}C_bR}{R}*\sqrt{\frac{k}{D_{Ca}}} = C_b*\sqrt{KD_{Ca}}\ [=]\ \text{mol}/(m^2 \cdot s)$$

So, it can be concluded that the extent of casting is proportional to the bath concentration and the square root of $D_{Ca}$.

Desiccating

In winding, a one-dimension mass transport model can be built. In this process, the fiber (cylinder) deswell. The $H_2O$ molecule diffuse out from the cylinder. A governing equation can be set according to the mass conservation of water and the assumption similar to the former problem. The governing equation is that $$\frac{\partial\omega}{\partial t} = \frac{D_w}{r}\frac{\partial}{\partial r}\left(r\frac{\partial\omega}{\partial r}\right) \tag{13}$$

where $\omega$ is the mass concentration of water, Dw is the diffusion coefficient of water.

The boundary conditions are that $$\frac{\partial\omega}{\partial r}\bigg|_{r=0} = 0 \tag{14}$$

$$\omega|_{r=R} = 0 \tag{15}$$

$$\omega|_{t=0} = \omega_0 \tag{16}$$

Then, equation (13) can be scaled by setting $\Theta=\omega/\omega_0$, $\xi=r/R$, $\tau=t/\tau_0$ where $\tau_0=R^2/D_w$.

$$\frac{\partial\Theta}{\partial\tau} = \frac{1}{\zeta}\frac{\partial}{\partial\zeta}\left(\zeta\frac{\partial\Theta}{\partial\zeta}\right) \tag{17}$$

And the boundary conditions are $$\frac{\partial\Theta}{\partial\zeta}\Big|_{\zeta=0} = 0 \tag{18}$$

$$\Theta\big|_{\zeta=1} = 0 \tag{19}$$

$$\Theta\big|_{t=0} = 1 \tag{20}$$

Solve equation 17 and apply equation 18, 19 and 20 in order to get:

$$\Theta = 2\sum_{n=1}^{\infty}\exp(-\lambda_n^2\tau)\frac{J_0(\lambda_n\zeta)}{J_1(\lambda_n)} \tag{21}$$

where $\lambda_n$ is the $n^{th}$ value satisfy $J_0(\lambda_n)=0$.

So the dehydration rate is that $$Ratedh = -D_w\frac{d\omega}{dr}\Big|_{r=R} = \tag{22}$$

$$-\frac{D_w\omega_0}{R}\frac{d\Theta}{d\zeta}\Big|_{\zeta=1} = \frac{2D_w\omega_0}{R}\sum_{n=1}^{\infty}\lambda_n\exp\left(-\lambda_n^2\frac{D_wt}{R^2}\right)[\,=\,]\,g/(m^2\cdot s)$$

Because when t is greater than 0, and $\lambda_1\gg\mu_n$ (n≥2)

$$Ratedh = \frac{2D_w\omega_0}{R}\sum_{n=1}^{\infty}\lambda_n\exp\left(-\lambda_n^2\frac{D_wt}{R^2}\right) \approx \tag{23}$$

$$\frac{2D_w\omega_0\lambda_1}{R}\exp\left(-\lambda_1^2\frac{D_wt}{R^2}\right)[\,=\,]\,g/(m^2\cdot s)$$

$$D_w \sim O(10^{-7} \sim 10^{-8})$$

Now data of dehydration can be analyzed. The first part is the extent of casting with different bath concentration, polymer composition and amount of adding glycerol.

Figure 11:
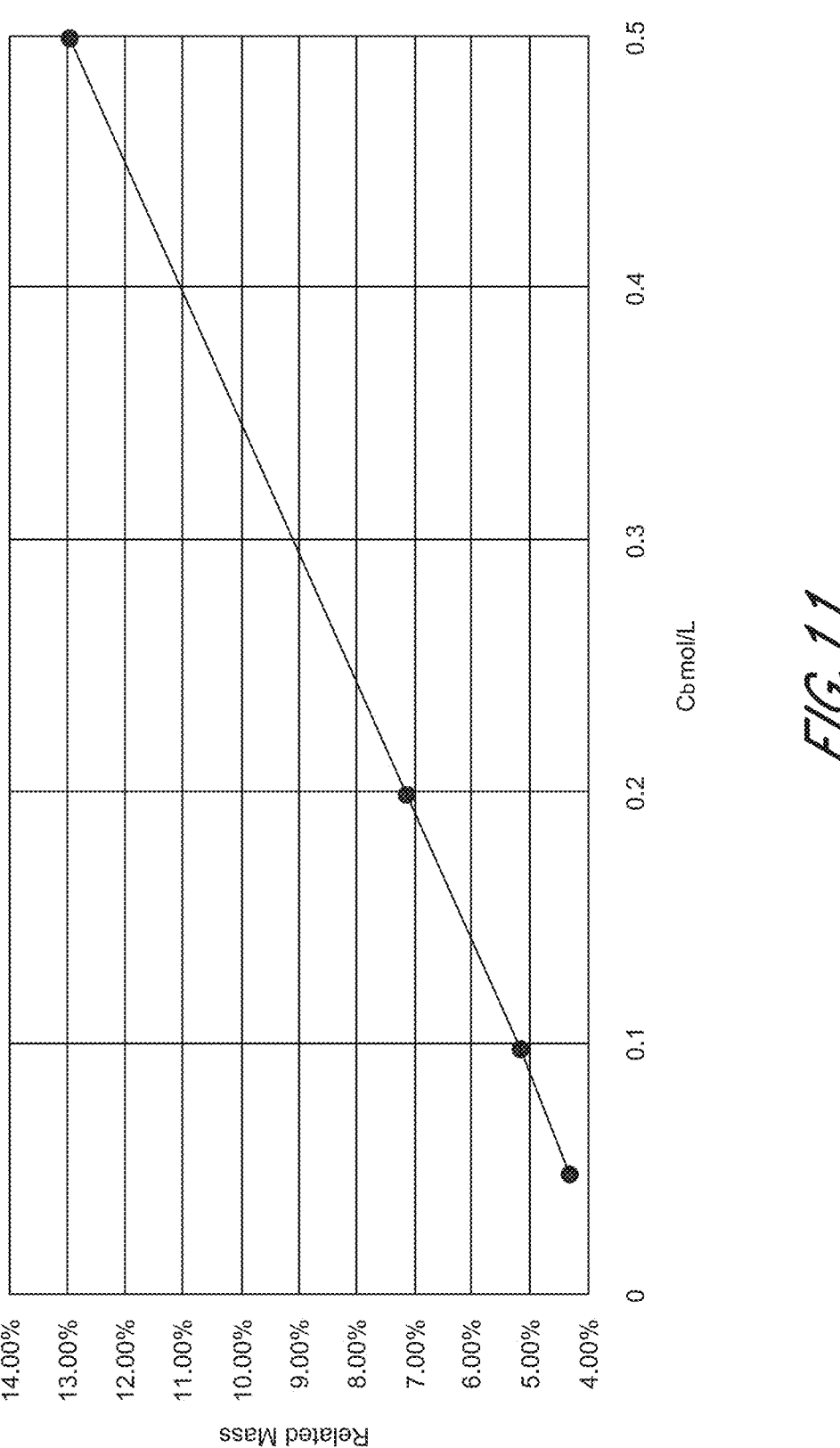
FIG. 11 shows an embodiment of data of dehydrated mass related to the initial mass will different concentration of calcium bath.

According to FIG. 11, the related mass (related to the initial mass) is linear with the bulk concentration of the bath, corresponding to the equation (12) when k and $D_{Ca}$ does not change, showing that the higher concentration of the bath, the larger amount of $Ca^{2+}$ casting with alginate.

Figure 12:
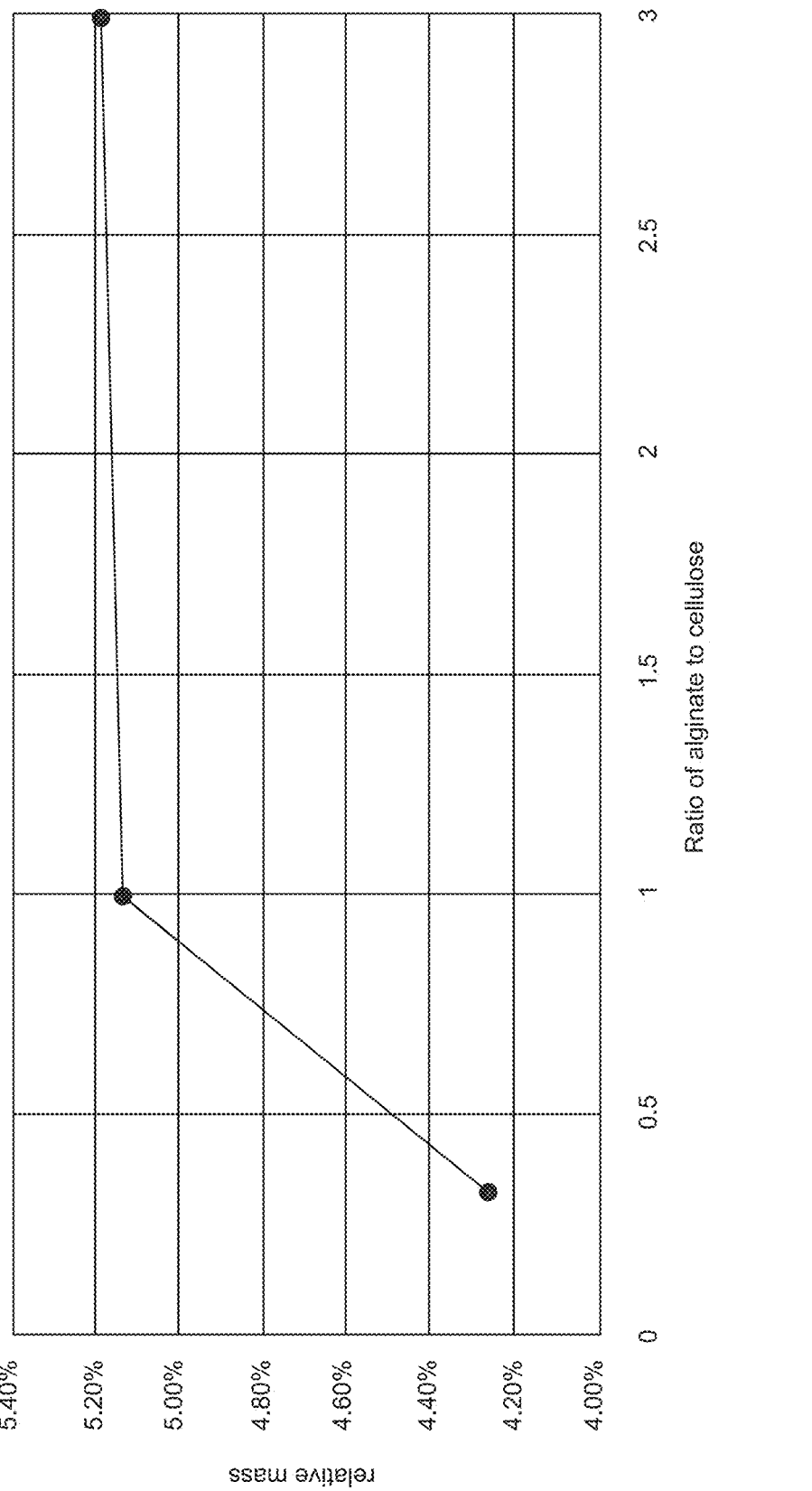
FIG. 12 shows an embodiment of data of dehydrated mass related to the initial mass with different ratio between alginate and methyl cellulose.

According to FIG. 12, when the ration increase from ⅓ to 1, the increase of dehydrated relative mass is much sharper than that of ration increase from 1 to 3. According to equation 12 and the fact that diffusion coefficient inversely correlates to the viscosity of the polymer solution, the figure indicates that the higher the percentage of methyl cellulose, the higher the viscosity is. Then, it can be concluded that the viscosity of the polymer solution which contains only low viscosity alginate and methyl cellulose is controlled by the amount of methyl cellulose. Adding more methyl cellulose means lower the diffusion coefficient of $Ca^{2+}$, leading to less interaction between alginate and $Ca^{2+}$. And according to equation 12, casting rate correlating to the square root of diffusion coefficient, the modification of viscosity at higher viscosity area is more conspicuous than that at lower area.

Figure 13:
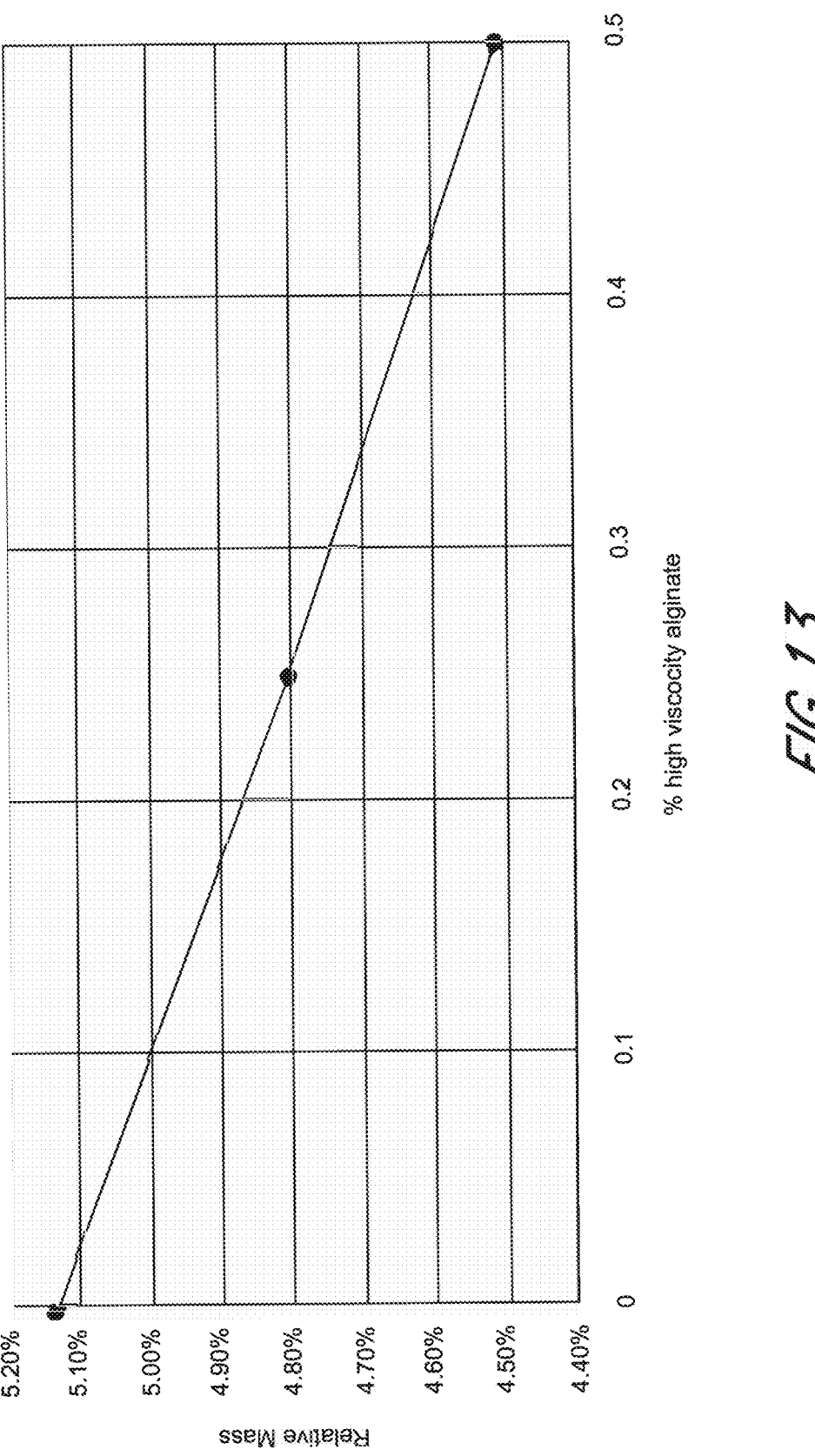
FIG. 13 shows an embodiment of data of different related dehydrated mass related to the initial mass with different composition of alginate.

FIG. 13 shows that the relative mass (related to the initial mass) decreases with the increase of ratio of high viscosity alginate, because the viscosity of the polymer increase with the increase of ratio of high viscosity alginate, less calcium ion would diffusion into the fiber in 1 h, corresponding to equation 12.

Figure 14:
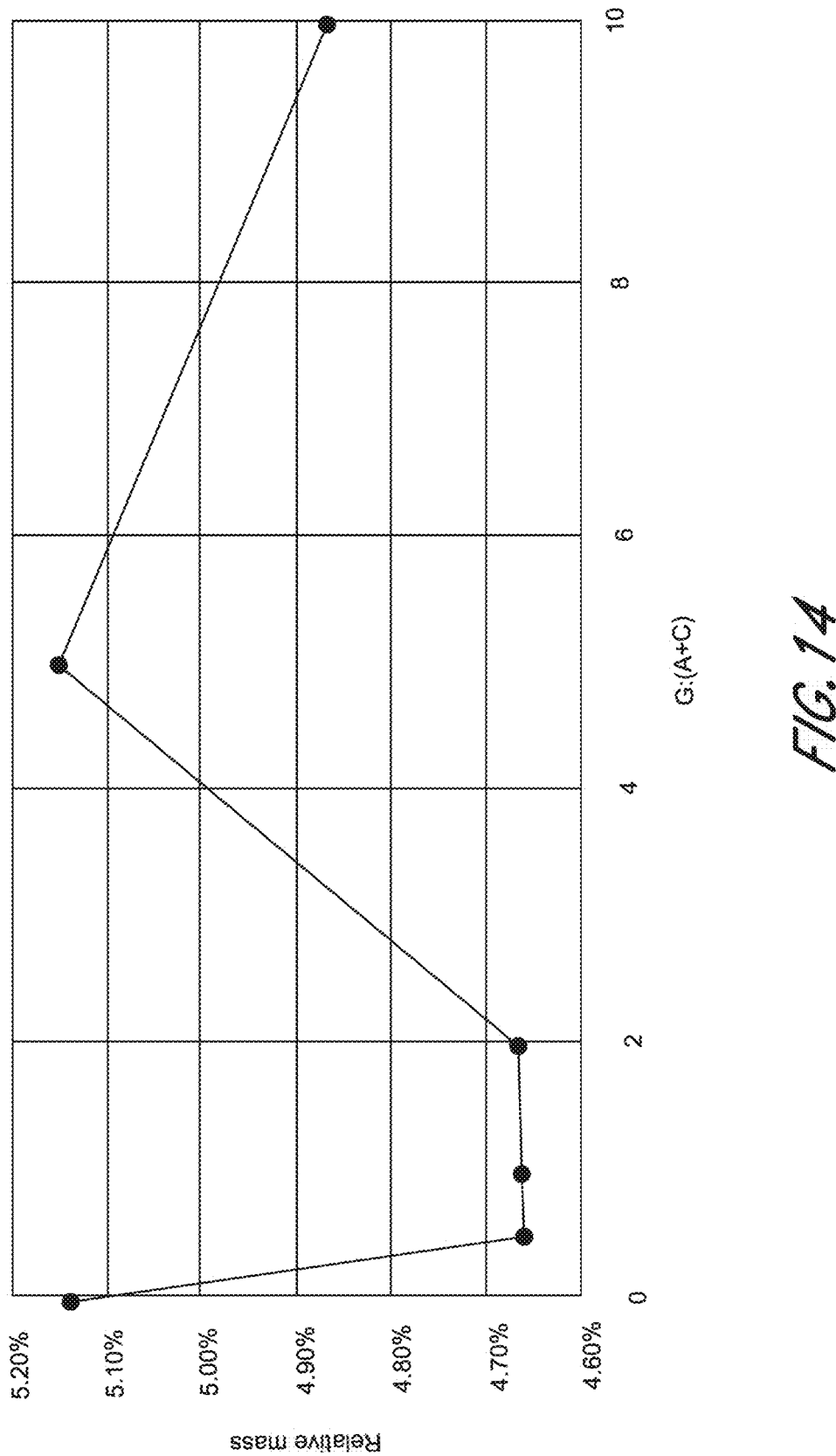
FIG. 14 shows an embodiment of data of different related dehydrated mass related to the initial mass with different amount of adding glycerol.

According to FIG. 14, adding small amount of glycerol reduces the dehydrated mass of fiber due to the hydrogen bond between water and glycerol molecules retaining more water in the fiber. So the relative mass would decrease. However, there is a trade-off between water retaining and viscosity reduction. When add too much glycerol (ratio of G:(A+C) greater than 2), the viscosity of polymer solution would decrease and allow more $Ca^{2+}$ diffusing into the fiber to increase the relative final mass. Yet in dehydration process, the excess glycerol that would be excluded leased to balancing out the increasing relative mass.

Analysis of the Dehydration Rate

In this part, because the mass lost is the only important parameter, the dehydration is measured by measuring the rate of deduction of related mass (related to the dehydrated mass) which defines as $$Rdh = \frac{M_r|_i - M_r|_{i+1}}{\Delta t} = M_r|_i - M_r|_{i+1}\,[\,=\,]\,g/(g\cdot h) \tag{24}$$

where i is the $i^{th}$ hour when measure the mass of the fiber. In this case, $\Delta t$ is set such that $\Delta t=1$ h.

Figure 15:
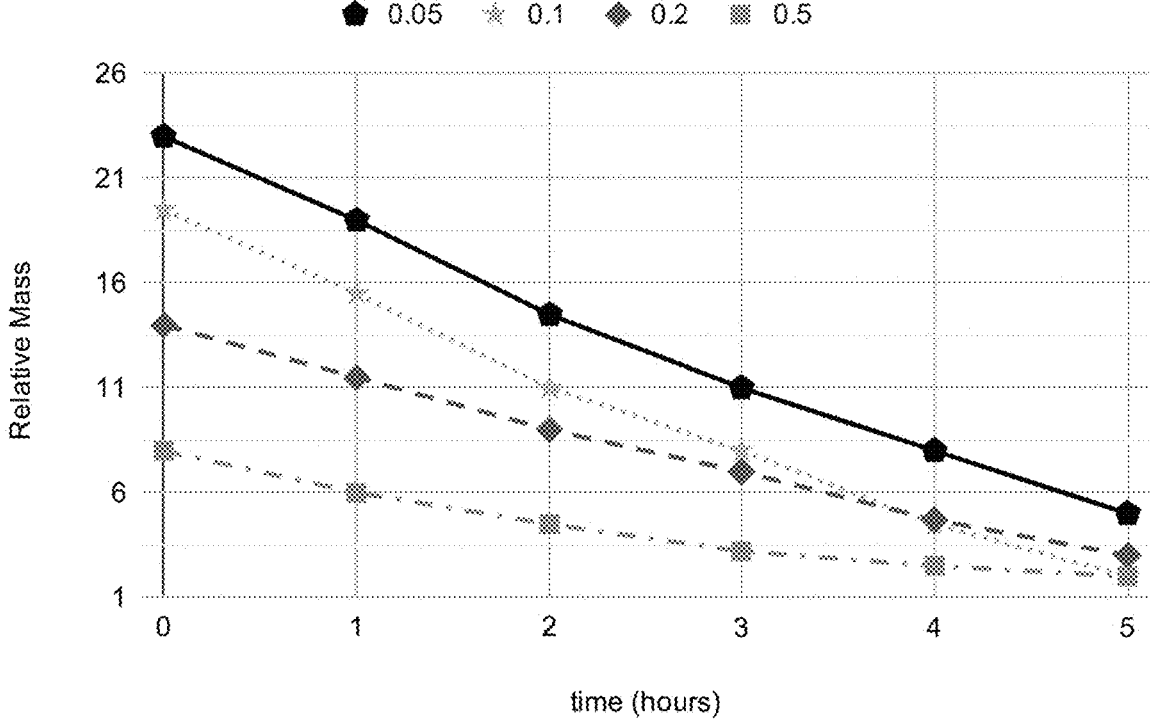
FIG. 15 shows an embodiment of data of dehydration curve with different concentration of bath.
Figure 16:
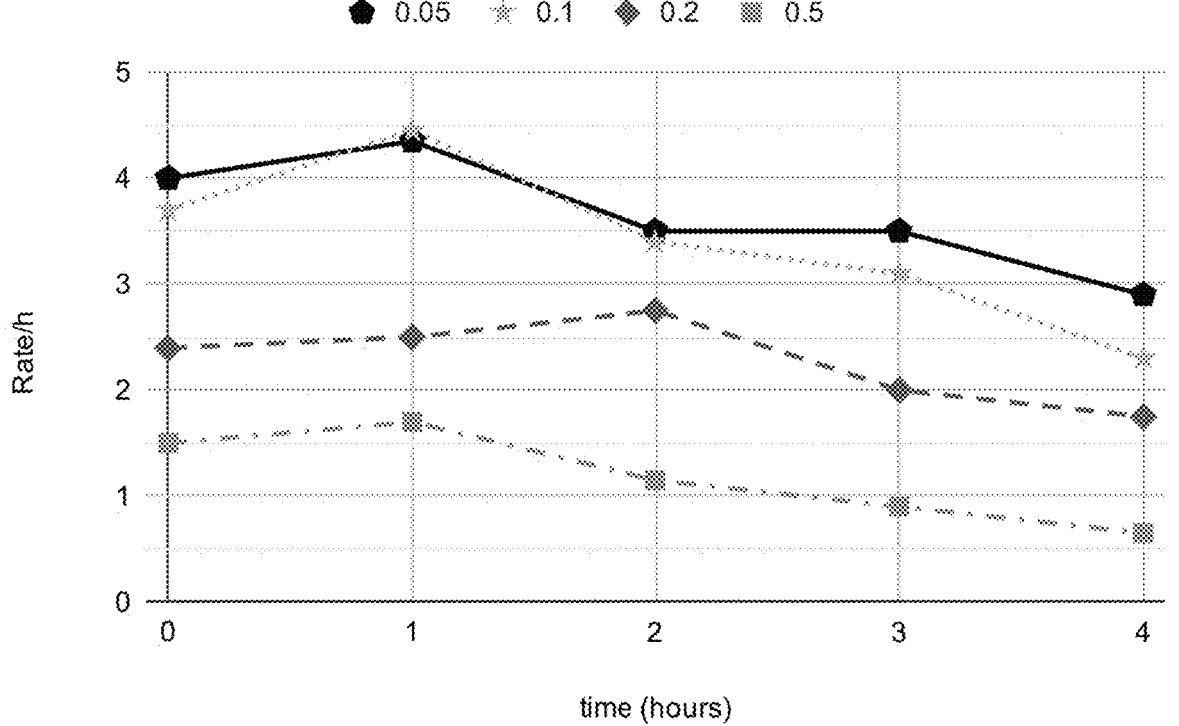
FIG. 16 shows an embodiment of data of dehydration rate of fiber with different bath concentration.

According to FIG. 15, at the initial time, more carboxyl group react with Calcium ion, the less availability it interacts with water molecule by hydrogen bond. So the initial relative mass will decrease, because more Calcium ion crosslinks with the polymer, less flexible the polymer molecules are. So $D_w$ will decrease with the increasing of casting bath. Because $D_w<O(10^{-8})$ and $R\sim O(10^{-3})$ and according to equation 23, the rate of decrease of dehydration will decrease with the decreasing of $D_w$ (FIG. 16). However, in dehydration with increasing with time, the radius of the fiber decline, deviating the dehydration rate from the exponential decrease.

Figure 17:
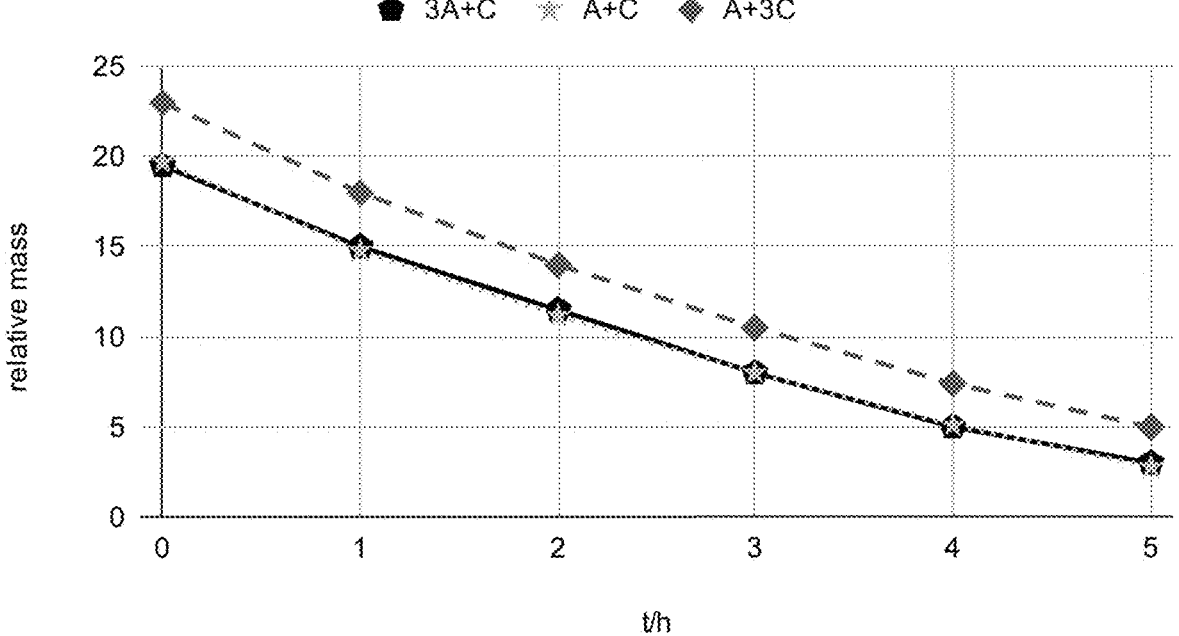
FIG. 17 shows an embodiment of data of dehydration curve with different ration between alginate and methyl cellulose.

According to FIG. 17, at the initial time, less carboxyl group react with Calcium ion than that of the rest of two, the more availability it interacts with water molecule by hydrogen bond. So the initial relative mass will increase. So $D_w$ will decrease with the increasing of methyl cellulose.

Figure 18:
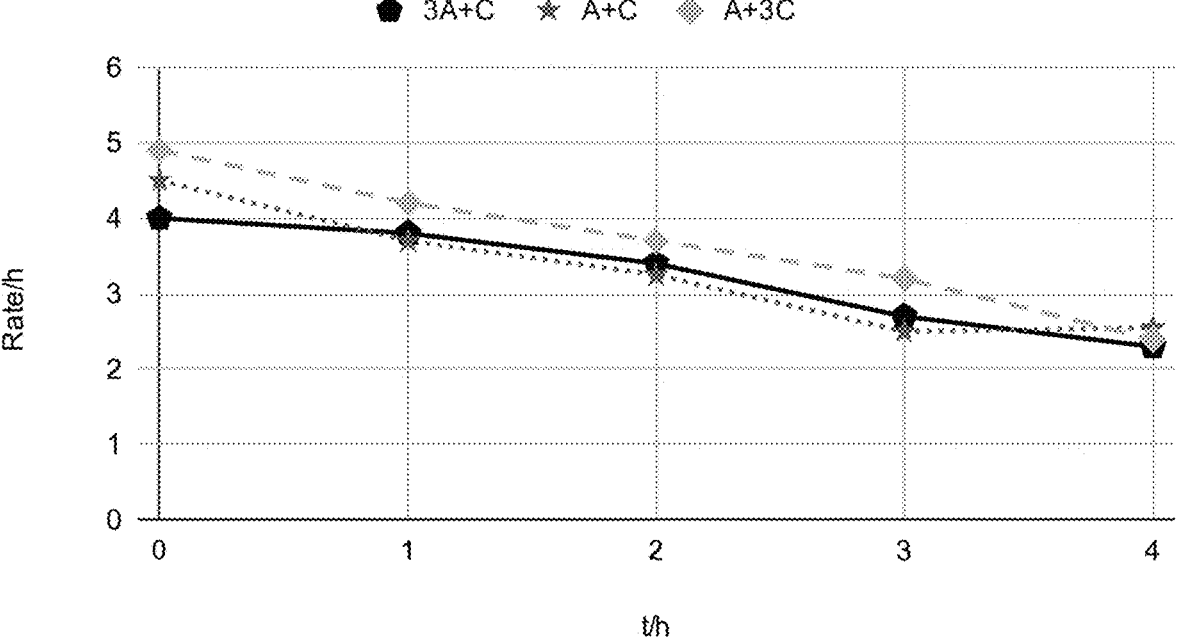
FIG. 18 shows an embodiment of data of dehydration rate of fiber with different composition.

Because $D_w<O(10^{-8})$ and $R\sim O(10^{-3})$ and according to equation 23, the rate of decrease of dehydration will decrease with the decreasing of $D_w$ (FIG. 18). However, in dehydration with increasing with time, the radius of the fiber decline, deviating the dehydration rate from the exponential decrease.

Figure 19:
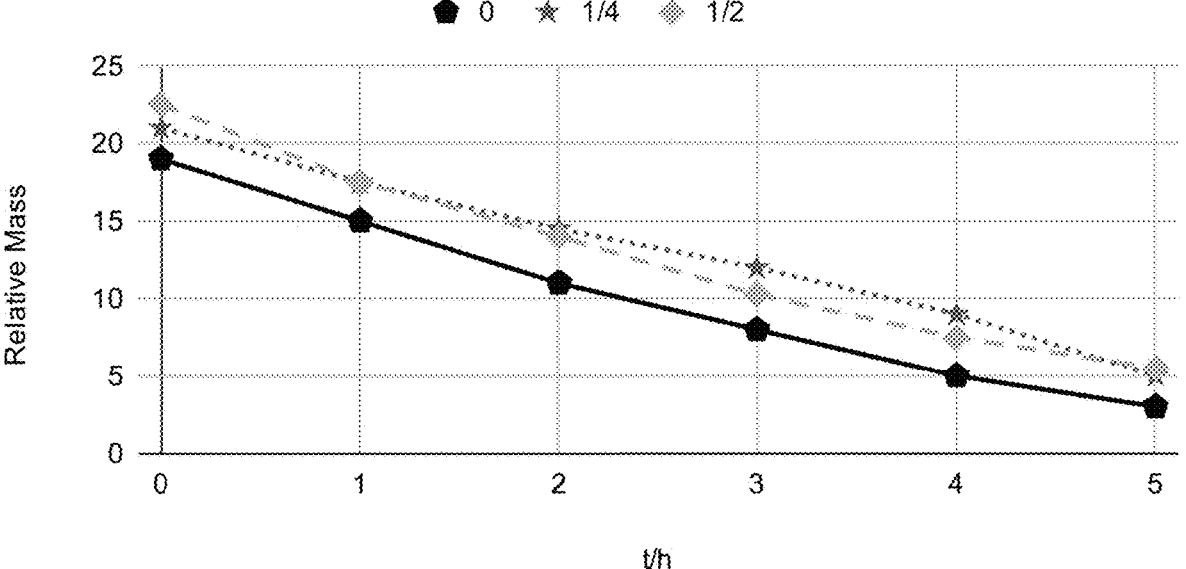
FIG. 19 shows an embodiment of data of dehydration curve of fiber with different fraction of high viscosity alginate.
Figure 20:
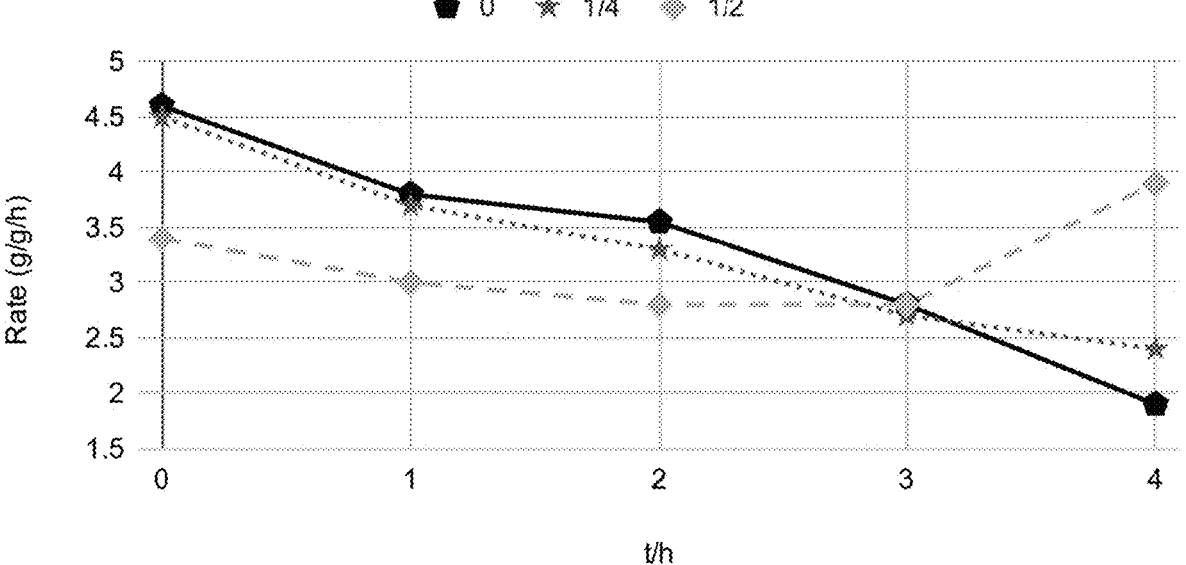
FIG. 20 shows an embodiment of data of dehydration rate of fiber with different fraction of high viscosity alginate.

FIG. 19 and FIG. 20 show data of dehydration curve with different composition of alginate. FIG. 19 shows an embodiment of data of dehydration curve of fiber with different fraction of high viscosity alginate. FIG. 20 shows an embodiment of data of dehydration rate of fiber with different fraction of high viscosity alginate.

Figure 21:
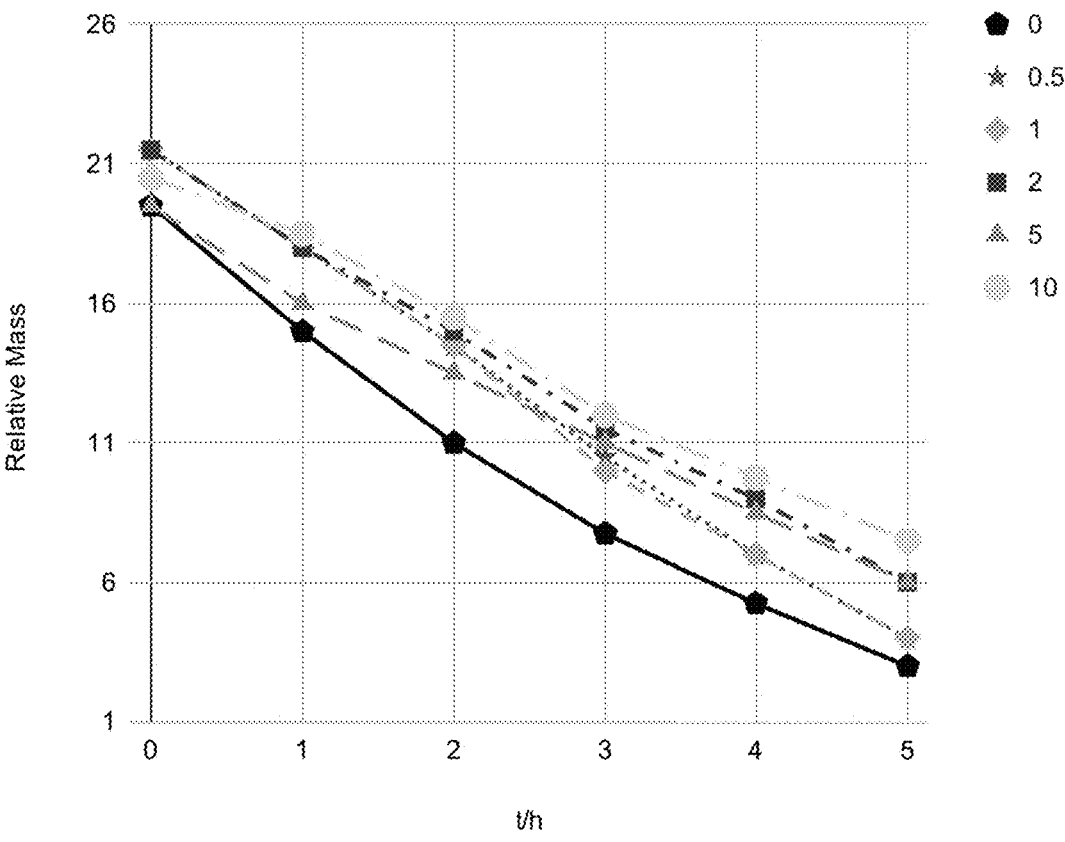
FIG. 21 shows an embodiment of data of dehydration curve of fiber with different ratio of G:P.
Figure 22:
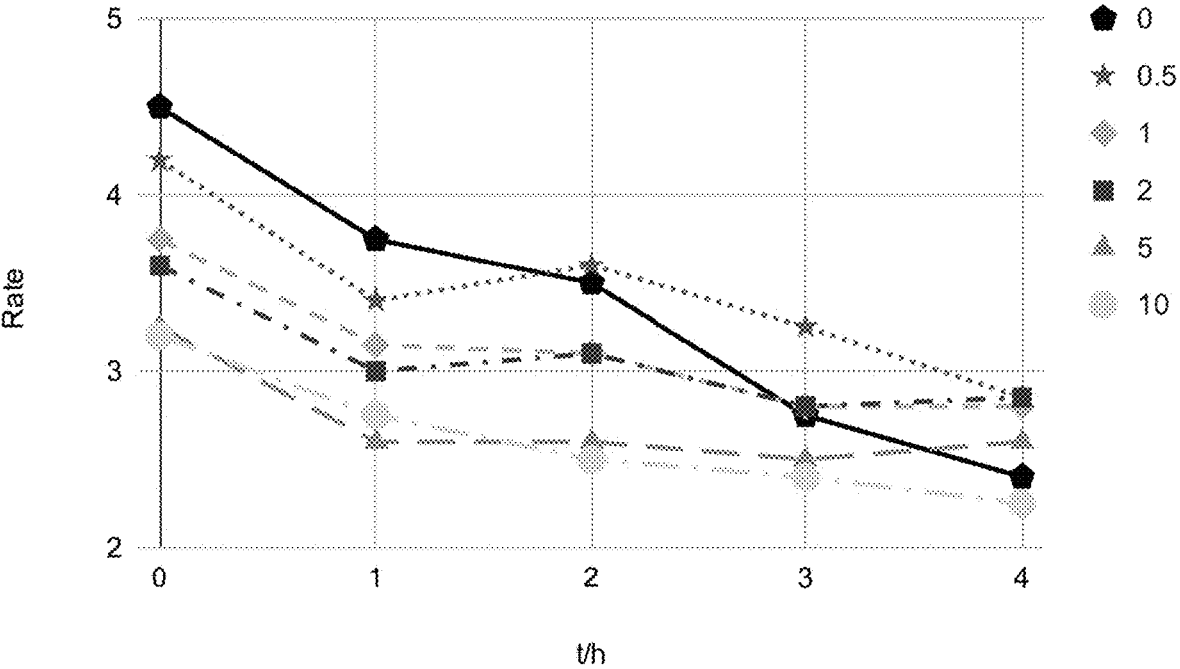
FIG. 22 shows an embodiment of data of dehydration rate of fiber with different ratio of G:P.
Figure 23:
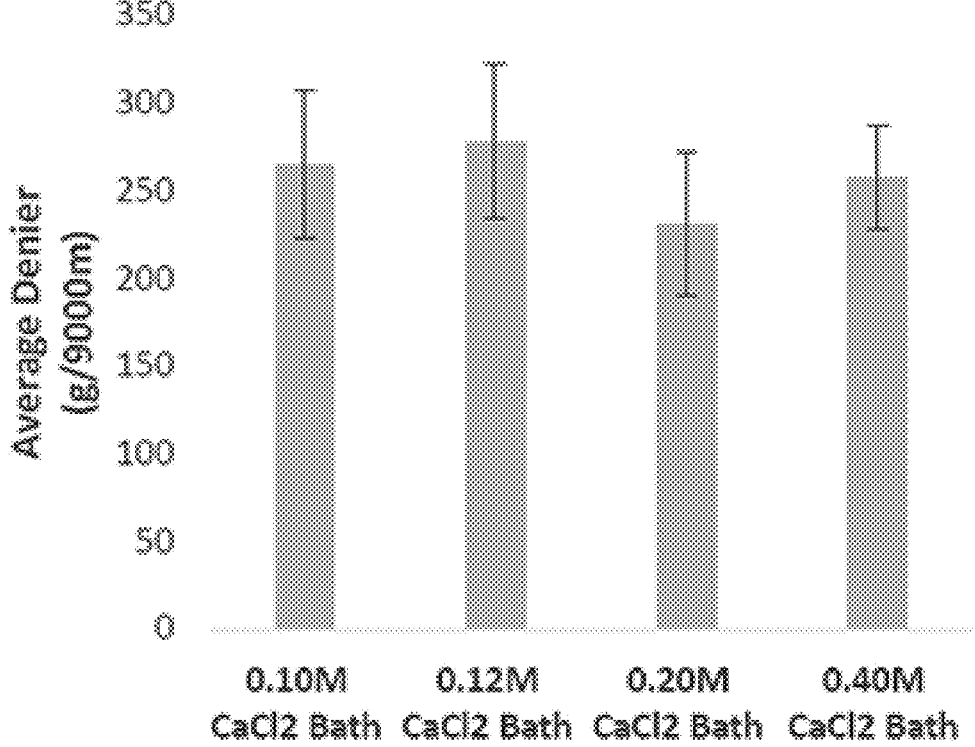
FIG. 23 shows an embodiment of data of toughness comparison between low and high viscosity alginate used in 1:1 and 7:1 alginate:methyl cellulose extruded fibers.

FIG. 21 and FIG. 22 shows data of dehydration curve with different amount of adding glycerol. FIG. 21 shows an embodiment of data of dehydration curve of fiber with different ratio of G:P. FIG. 22 shows an embodiment of data of dehydration rate of fiber with different ratio of G:P.

Example 4. Denier Calculations

Figure 24:
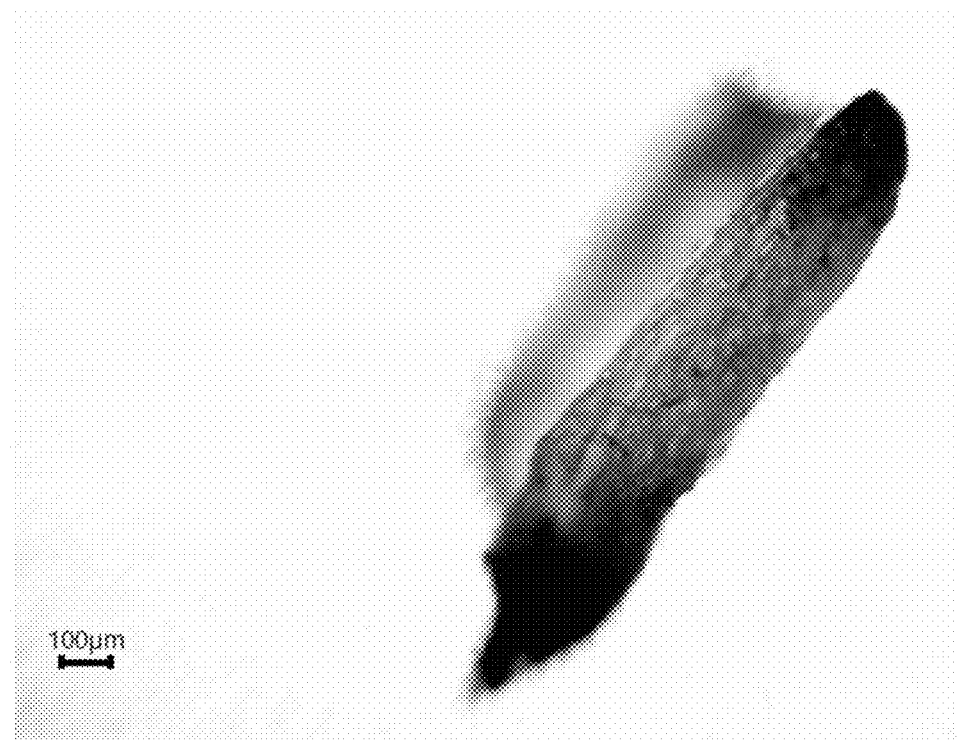
FIG. 24 shows a microscopic image of a fiber, where the ratio of the short versus long side of the fiber was about 1:5.

Adjusted denier calculation is based on modifying the assumption that the fiber is circular and assuming the fiber is elliptical. When a caliper is used to measure the diameter of the fiber, it only measures the smaller side of an elliptical fiber. The area is adjusted by using a microscope image to find the ratio of the short and long side of the fiber which was about 1:5 (FIG. 24).

A: area
d: diameter
r: radius, d/2
Area of a circle:

$$A = \pi r^2$$

Area of an ellipse:

$$A = \pi ab$$

where d=2b, r=b, and a=5b $$A = \pi 5 r^2$$

Tenacity is calculated as a force per area. When the ratio of the short and long side of the ellipse is 1:5, the area of the ellipse is 5 times larger than a circular area with a diameter equal to the short side of the ellipse. Thus, depending upon the actual dimensions/area of the fiber, it may be that the strength of the fibers determined in the present fibers should be updated as outlined above, based upon the observation of a different cross-sectional dimension than previously assumed (i.e., circular (assumed initially) vs. elliptical).

In the present example, several mechanically extruded fibrous samples were assessed based upon their linear mass density, also known as a Denier measurement.

Denier is a unit of measure for the linear mass density of fibers, which is denoted by its mass in grams per 9000 meters. It is useful to know a fiber's denier count in order to efficiently apply the fabric for the correct applications. Fabrics with high denier counts tend to be much thicker and durable, while fabrics with low denier have softer and silk properties.

Alginate Extrusion

High viscosity (HV) alginic acid sodium salt (Alfa Aesar, Ward Hill, MA) was used in addition to the very low viscosity alginic acid sodium salt. Methyl cellulose was continuously used as a copolymer. HV alginate were dissolved separately with methyl cellulose in deionized water to create 0.20M (total polymer, calculated by molecular weight) solutions. Several calcium chloride dihydrate solutions (0.10M, 0.12M, 0.20M, 0.40M) were prepared in deionized water to perform as the crosslinking bath.

HV alginate fibers were extruded using a 20 mL syringe with an 18½ gauge needle. The tip of the needle was submerged into a calcium chloride bath ten times the volume of the alginate solution. Extruded fibers were immersed in the bath for an hour, then washed twice with deionized water to remove calcium ions. Alginate fibers were left to dry overnight at room temperature.

Denier Calculations

Extruded HV alginate fibers (n=5/sample) were cut to specific lengths and measured with a standard ruler. Subsequently, each sample was then weighed on a laboratory scale.

Denier for each sample was calculated by the following equation:

$$D = \frac{9000\,m}{\text{length of fiber (m)}} * \text{weight of fiber(g)}$$

Results of Denier Calculations

HV alginate fibers with a total polymer concentration of 0.20M were measured by specific lengths and weighed to calculate their corresponding denier. Table 4.1 shows the average denier measurements for several HV alginate fibers that were crosslinked in different concentrations of calcium chloride baths.

TABLE 4.1

| | Average Denier for HV alginate fibers crosslinked in various calcium chloride baths | | |
|---|---|---|---|
| Fiber Concentration | Bath Concentration (M) | Average Denier (g/9000m) | Standard Deviation |
| 0.20M Total polymer Concentration | 0.10 | 265.2 | 42.32 |
| 0.20M Total polymer Concentration | 0.12 | 278.4 | 44.02 |
| 0.20M Total polymer Concentration | 0.20 | 231.6 | 40.97 |
| 0.20M Total polymer Concentration | 0.40 | 258 | 29.25 |
| Silk/Linen Fiber^ | — | 6292.8 | — |

^Only one sample was measure for this group

Example 5. Producing an Alginate Fiber

A fiber is produced from an alginate composition. The fiber is produced by first curing the alginate composition in a curing bath. The fiber is then produced from the cured alginate composition through extrusion. The alginate composition is comprised of sodium alginate, methyl cellulose, and a polyol plasticizer. The polyol plasticizer is a glycerol. The alginate composition is further comprised of an amount of methyl cellulose is about 50 wt % to about 90 wt % of sodium alginate, an amount of sodium alginate ranges from about 3.75 wt % to about 7.85 wt % of the total mass, and an amount of glycerol that ranges from about 25 wt % to about 250 wt % of a total amount of sodium alginate and methyl cellulose. In some cases, the amount of sodium alginate in the alginate composition is about 5.75 wt % of the total mass. The alginate composition has a purity of 80% or more.

It is to be understood that the present invention is not to be limited to the exact description and embodiments as illustrated and described herein. To those of ordinary skill in the art, one or more variations and modifications will be understood to be contemplated from the present disclosure. Accordingly, all expedient modifications readily attainable by one of ordinary skill in the art from the disclosure set forth herein, or by routine experimentation therefrom, are deemed to be within the true spirit and scope of the invention as defined by the appended claims.

It would be understood that the various sizes, materials, configurations and arrangements disclosed herein may be combined and constructed in any way that is feasible to create a hybrid for any particular end use. Accordingly, all suitable modifications and equivalents may be resorted to falling within the scope of the appended claims. Unless defined otherwise, all technical and scientific terms used herein have same meaning as commonly understood by one of ordinary skill in the art to which this application belongs. Also, as used herein and in the appended claims, the singular form "a", "and", and "the" include plural referents unless the context clearly dictates otherwise. The definition of "about" include +/−25% of the recited value.

What is claimed is:

1. A fabric, comprising:
   a fiber,
   wherein the fiber is contained within a yarn, a knit, or a woven textile,
   wherein the fiber is produced through extrusion,
   wherein the fiber is produced by curing an alginate composition in a curing bath, and
   wherein the alginate composition has a total mass and comprises (i) methyl cellulose, (ii) a polyol plasticizer that is a glycerol, (iii) an amount of sodium alginate that ranges from about 3.75 wt % to about 7.85 wt % of the alginate composition's total mass, (iv) an amount of methyl cellulose that is about 50 wt % to about 90 wt % of the amount of sodium alginate, and (v) an amount of glycerol that ranges from about 25 wt % to about 250 wt % of a total amount of sodium alginate and methyl cellulose in the alginate composition.

2. The fabric of claim 1, wherein the yarn is contained within an apparel, a garment, or a piece of clothing.

3. The fabric of claim 1, wherein the fiber is combined with a natural or non-alginate-based synthetic fiber.

4. The fabric of claim 1, wherein the fiber comprises a dye using a dip-dying or dope-dying process.

5. The fabric of claim 1, wherein the fiber has a tensile strength of about 0.1 grains/denier to about 0.8 grams/denier.

6. The fabric of claim 1, wherein the amount of sodium alginate is about 5.75 wt %.

7. The fabric of claim 1, wherein the alginate composition has a purity of 80% or more.

8. The fabric of claim 1, wherein the curing bath comprises water and calcium chloride.

9. The fabric of claim 8, wherein water is deionized or distilled.

10. The fiber of claim 8, wherein an amount of calcium chloride ranges from about 0.08 M to about 0.15 M.

11. The fabric of claim 10, wherein the amount of calcium chloride is about 0.12 M.

12. The fabric of claim 1, wherein a calcium content in the fiber ranges from about 2.5 wt % to about 5.25 wt %.

* * * * *